US009525867B2

United States Patent
Thomas et al.

(10) Patent No.: US 9,525,867 B2
(45) Date of Patent: Dec. 20, 2016

(54) SYSTEMS, DEVICES, AND METHODS FOR ANALYZING SKIN IMAGES

(71) Applicant: CANFIELD SCIENTIFIC, INCORPORATED, Fairfield, NJ (US)

(72) Inventors: Mani V. Thomas, Hillsborough, NJ (US); William Paul Halas, Long Valley, NJ (US); Daniel Gregory Cherill, Flanders, NJ (US)

(73) Assignee: Canfield Scientific, Incorporated, Parsippany, NJ (US)

( * ) Notice: Subject to any disclaimer, the term of this patent is extended or adjusted under 35 U.S.C. 154(b) by 155 days.

(21) Appl. No.: 14/633,253

(22) Filed: Feb. 27, 2015

(65) Prior Publication Data
US 2015/0170377 A1 Jun. 18, 2015

Related U.S. Application Data

(63) Continuation of application No. 13/605,508, filed on Sep. 6, 2012, now abandoned.
(Continued)

(51) Int. Cl.
| | |
|---|---|
| A45D 44/00 | (2006.01) |
| H04N 17/02 | (2006.01) |
| G01J 3/50 | (2006.01) |
| G01J 3/52 | (2006.01) |
| G06T 7/00 | (2006.01) |

(Continued)

(52) U.S. Cl.
CPC ............ H04N 17/02 (2013.01); A45D 44/005 (2013.01); G01J 3/50 (2013.01); G01J 3/524 (2013.01); G06K 9/00362 (2013.01); G06K 9/00885 (2013.01); G06K 9/46 (2013.01); G06K 9/6201 (2013.01); G06T 5/00 (2013.01); G06T 7/0012 (2013.01); G06T 7/408 (2013.01); G09B 19/00 (2013.01); A45D 2044/007 (2013.01); G06T 2207/10004 (2013.01); G06T 2207/10024 (2013.01); G06T 2207/30088 (2013.01)

(58) Field of Classification Search
CPC .... A45D 2044/007; A45D 44/005; G01J 3/50; G01J 3/524; G06K 9/00362; G06K 9/00885; G06K 9/46; G06K 9/6201; G06T 2207/10004; G06T 2207/10024; G06T 2207/30088; G06T 5/00; G06T 7/0012; G06T 7/408; G09B 19/00
See application file for complete search history.

(56) References Cited

U.S. PATENT DOCUMENTS

2010/0214421 A1 * 8/2010 Qu ............................. G01J 3/46
348/207.1

* cited by examiner

*Primary Examiner* — Siamak Harandi
(74) *Attorney, Agent, or Firm* — Brosemer, Kolefas & Assoc. LLC

(57) ABSTRACT

Embodiments of a method for performing image analysis include accessing a digital image of a subject, the digital image comprising a portion of a target substrate of the subject, the digital image comprising a portion of a calibration device; detecting a position of the calibration device by searching the digital image for a predetermined background color; detecting a plurality of color chips on the calibration device; mapping a position of the plurality of color chips on the digital image, each of the plurality of color chips comprising a predetermined chip color; comparing at least a portion of the plurality of color chips with a predetermined color standard; and altering the digital image, based on the comparison, to provide consistent image parameters with other images of the subject.

38 Claims, 37 Drawing Sheets

Related U.S. Application Data

(60) Provisional application No. 61/531,280, filed on Sep. 6, 2011, provisional application No. 61/545,920, filed on Oct. 11, 2011.

(51) Int. Cl.
| | |
|---|---|
| *G06T 7/40* | (2006.01) |
| *G06K 9/00* | (2006.01) |
| *G06K 9/46* | (2006.01) |
| *G06K 9/62* | (2006.01) |
| *G06T 5/00* | (2006.01) |
| *G09B 19/00* | (2006.01) |

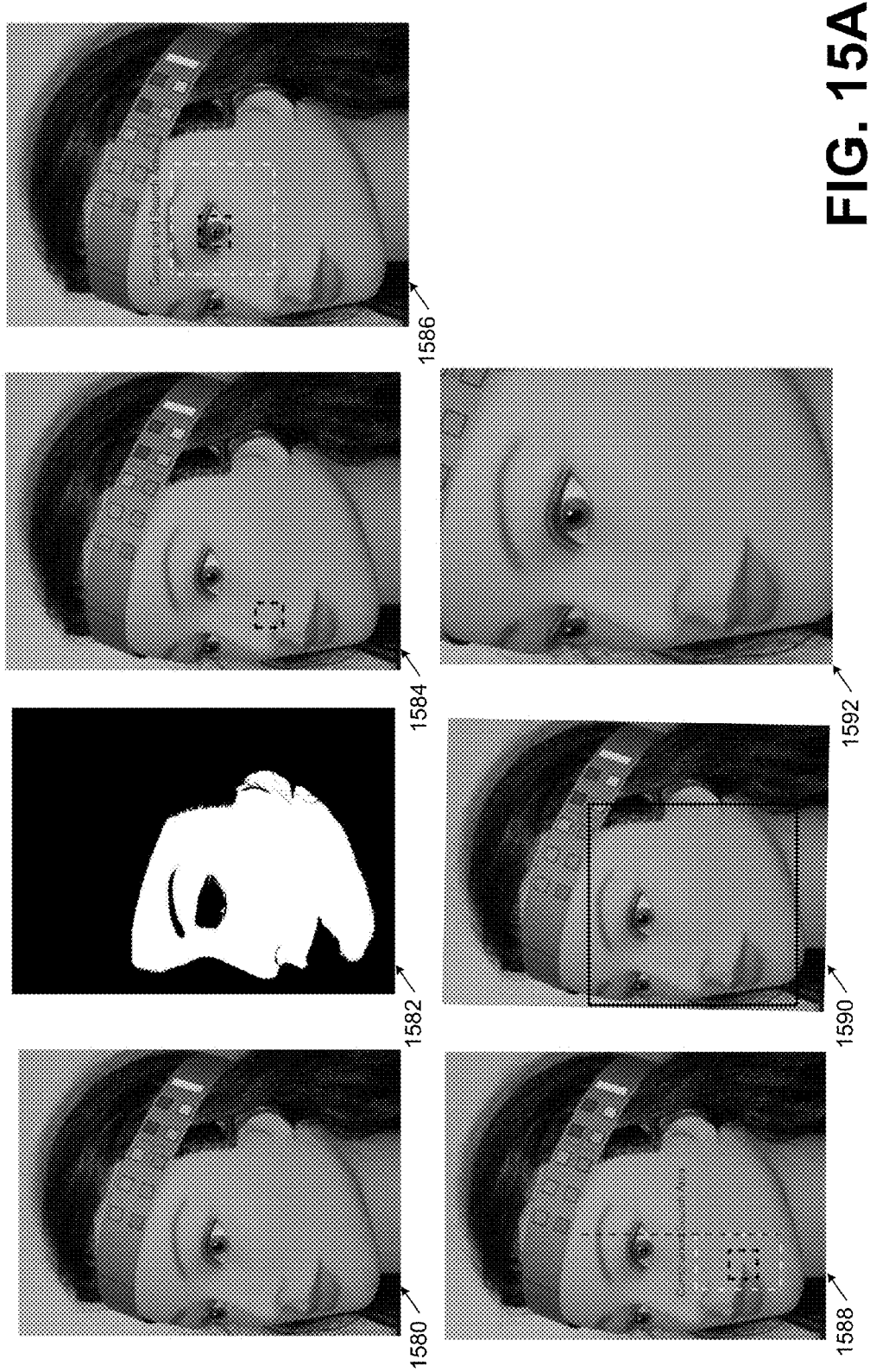

SYSTEMS, DEVICES, AND METHODS FOR ANALYZING SKIN IMAGES

RELATED PATENT APPLICATIONS

The present application is a continuation of and claims the benefit under 35 U.S.C. §120 of U.S. patent application Ser. No. 13/605,508, which was filed on Sep. 6, 2012 and which claims priority from U.S. Provisional Patent Application No. 61/531,280 filed on Sep. 6, 2011 and from U.S. Provisional Patent Application No. 61/545,920 filed on Oct. 11, 2011, all of which are incorporated herein by reference in their entireties.

FIELD OF THE INVENTION

The present invention relates in general to systems, devices, and methods for performing image analysis.

BACKGROUND INFORMATION

Countless individuals all over the world seek to improve their physical appearance and health through the use of medical and cosmetic products, such as color cosmetics, skin care products, body care products, hair care products, etc. Many of these products are available through retail stores and/or pharmacies, where a live consultant may be available to assist with the selection of the most appropriate product. In some instances, virtual consultations may be provided in the retail store to assist with the product selection. However, oftentimes, these consultations may be difficult and/or embarrassing for the user to complete at the retail establishment. Further, oftentimes the user has no place to store, share, compare, or otherwise utilize the consultation analysis and/or product recommendations.

In addition, there is a continuing desire to provide systems, devices, and methods that enable a consumer to track his/her usage of cosmetic products at dates, times, and locations of his/her choice. Still further, there is continuing desire to provide systems, devices, and methods that provide ubiquitous access to product recommendations, data associated with a consumer's use of cosmetic products, and/or data associated with the state of the consumer's skin. Still yet further, there is a continuing desire to provide systems, devices, and methods that can accommodate the use of different image capture devices at disparate locations as part of the tracking and/or consultation experience.

SUMMARY OF THE INVENTION

Embodiments of a method for performing image analysis include accessing a digital image of a subject, the digital image comprising a portion of a target substrate of the subject, the digital image comprising a portion of a calibration device; detecting a position of the calibration device by searching the digital image for a predetermined background color; detecting a plurality of color chips on the calibration device; mapping a position of the plurality of color chips on the digital image, each of the plurality of color chips comprising a predetermined chip color; comparing at least a portion of the plurality of color chips with a predetermined color standard; and altering the digital image, based on the comparison, to provide consistent image parameters with other images of the subject.

Embodiments of a system for performing image analysis include a memory component that stores logic that, when executed by the system, causes the system to perform at least the following: access a digital image of a subject, the digital image comprising a portion of a target substrate of the subject, the digital image comprising a portion of a calibration device; detect a position of the calibration device by searching the digital image for a predetermined background color; detect a plurality of color chips on the calibration device; map a position of the plurality of color chips on the digital image, each of the plurality of color chips comprising a predetermined chip color; compare at least a portion of the plurality of color chips with a predetermined color standard; and alter the digital image, based on the comparison, to provide consistent image parameters with other images of the subject.

The above and other aspects and features of the present invention will be apparent from the drawings and detailed description which follow.

BRIEF DESCRIPTION OF THE DRAWINGS

The following description of various embodiments of the present disclosure can best be understood when read in conjunction with the following drawings:

FIGS. 15A and 15B depict a plurality of images that illustrates feature detection and spatial image adjustment, according to some embodiments disclosed herein;

DETAILED DESCRIPTION

Figure 1:
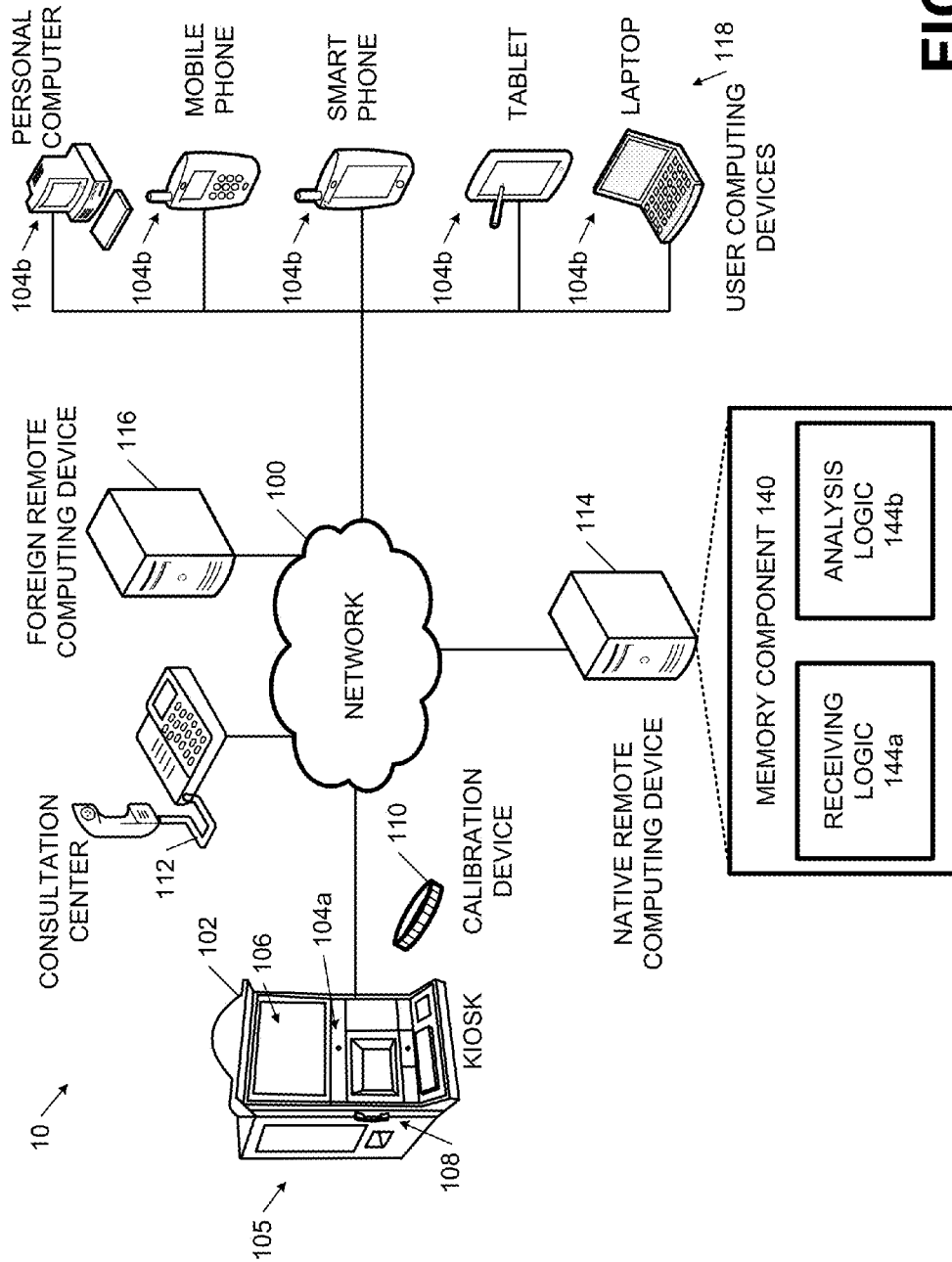
FIG. 1 depicts a system illustrating various components that may be utilized for providing virtual consultation, according to some embodiments disclosed herein.

The present invention will now be described with occasional reference to the specific embodiments of the invention. This invention may, however, be embodied in different forms and should not be construed as being limited to the embodiments set forth herein. Rather, these embodiments are provided so that this disclosure will be thorough and complete, and to fully convey the scope of the invention to those skilled in the art.

The skilled artisan will readily appreciate that the devices and methods herein are merely exemplary and that variations can be made without departing from the spirit and scope of the invention. It is also to be understood that the terminology used herein is for the purpose of describing particular embodiments only and is not intended to be limiting. As used in the description of the invention and appended claims, the singular "a," "an," and "the" are intended to include the plural forms as well, unless the context clearly indicates otherwise.

Unless otherwise defined, all technical and scientific terms used herein have the same meaning as commonly understood by one of skill in the art to which this invention pertains. The terminology used in the description of the invention herein is for describing the particular embodiments only and is not intended to be limiting of the invention.

The term "cosmetic products" means any good that may be used to improve and/or alter the appearance and/or health of a user. Cosmetic products include, but are not limited to, products for treating hair (human, dog, and/or cat), including, bleaching, coloring, dyeing, conditioning, growing, removing, retarding growth, shampooing, styling; deodorants, and antiperspirants; personal cleansing, including the washing, cleaning, cleansing, and/or exfoliating of the skin, including the face, hands, and body, optionally in concert with a cleaning implement, including a sponge, woven substrate, or non-woven substrate; color cosmetics; products, and/or methods relating to treating skin (human, dog, and/or cat), including application of creams, lotions, and other topically applied products for consumer use; and products and/or methods relating to orally administered materials for enhancing the appearance of hair, skin, and/or nails (human, dog, and/or cat); and shaving, including razors and other shaving devices as well as compositions applied before or after shaving.

The term "kiosk" means any stand alone device, electronic of otherwise that is specifically and exclusively configured for providing an audio and/or visual consultation to a user. The consultation may additionally include providing a calibration device and/or other a previously inaccessible item (such as a cosmetic product and/or calibration device) to a user. In such instances, the item may be purchased and/or dispensed from the kiosk. The consultation may additionally include providing an option for a virtual selection and/or purchase of one or more cosmetic products. In such instances, the cosmetic products may be shipped to the user at a specified location or the kiosk may provide directions to a brick and mortar retail location where the cosmetic product may be purchased or is awaiting pickup. Kiosks may be provided in a wide variety of shapes and sizes and may be located in retail locations, such as shopping malls, medical offices, etc.

The term "consultation data" means any information that may be provided to a user as part of a consultation.

The term "general purpose computer" means any computing device that can receive and store different applications and/or logic for execution.

The term "social network" means any system for providing an electronic forum for users to interact with other users. Some non-limiting examples of social networking systems suitable for use with the present invention are described in USPNs 2011/0093460 and 2010/0132049.

The term "cosmetic products" means any product that may be applied to a target substrate to alter the appearance and/or health of the target substrate.

The following description includes reference to different colors and color spaces. In that regard, the following conventions may be followed. These terms may be defined with additional language in the remaining portions of the specification.

The term "LAB color space" refers to a color measurement convention wherein the L value, A value and B value may be plotted in a three dimensional space using polar components where dimension L defines lightness and A and B for the color-opponent dimensions, based on nonlinearly compressed CIE XYZ color space coordinates.

The term "RGB color space" refers to any additive color space based on the red-green-blue (RGB) color model. A particular RGB color space is defined by the three chromaticities of the red, green, and blue additive primaries, and can produce any chromaticity that is the triangle defined by those primary colors. The complete specification of an RGB color space also requires a white point chromaticity and a gamma correction curve.

"Target substrate" is a portion of a user's body, including, without limitation, skin, hair, lips, nails, eyes, and teeth, to which portion sample areas may be color corrected based on a comparison of the calibration device to known color and/or resolution standards. In some embodiments, the target substrate is the face and in some embodiments the target substrate is one side of the face (e.g., substantially either the right or left side of the face including the eye and cheek thereof).

Example System

Referring now to the drawings, FIG. 1 depicts a system 10 illustrating various components that may be utilized for providing a beauty consultation to a consumer from one or more computing devices. While the components of FIG. 1 are depicted as a system, one or more of the components depicted may be removed, depending on the particular embodiment. The system 10 also permits a consumer to access his/her consultation data from a plurality of computing devices in disparate locations at the time and place of his/her choosing.

As illustrated, the system includes a network 100, which may include a local area network and/or a wide area network, such as the internet, a public switched telephone network (PSTN), a mobile telephone network, etc. any of which may be configured to provide a wired and/or wireless communication platform. Coupled to the network 100 is a kiosk 102 or other terminal, which may be configured for providing a personal consultation, a semi-personal consultation, and/or a virtual consultation. Similarly, the kiosk 102 may include an outer shell and/or a dispensing unit 105 for dispensing a calibration device 110 and/or one or more cosmetic products to a consumer before, during or after a personal consultation.

A personal consultation may include a human consultant that is physically present at the kiosk 102 to provide an analysis, treatment recommendations, and/or product recommendation. The recommendations may be provided by a user interface, a printable page, an email, a text message (e.g., SMS), and/or via other protocols. Similarly, a semi-personal consultation may include utilizing an image capture device 104a, a display device 106, and/or a communications device 108 to communicate with a human consultant that is remotely located from the kiosk 102, such as via a consultation center 112. As illustrated, the image capture device 104a (such as described in U.S. Pat. Nos. 7,965,310, 7,719,570), display device 106, and/or communications device 108 may be built into a housing of the kiosk 102. The kiosk 102 may further comprise the dispensing unit 105 for storing one or more cosmetic products that may be purchased and/or dispensed to a consumer from the kiosk 102. In one embodiment, the image capture device 104a and the display device 106 are positioned in the dispensing unit 105 on a side panel of the kiosk 102. The image capture device 104a may be movably mounted within the housing 109 so that it can be positioned in a configuration suitable to capture the consumer's face during use.

For example, the image capture device 104a may be pivotally mounted in a bracket attached to the kiosk 102, wherein an arm may be used by the consumer to pivot the image capture device 104a. Similarly, the image capture device 104a may be slidably mounted on one or more vertical tracks that permit sliding movement of the image capture device 104a within the kiosk 102. Additionally, a call button or other user interface may be positioned on the kiosk 102 for automatically initiating an audio/video consultation with the consultation center 112. The call button (or other user interface) may be connected to communication hardware and/or software within the kiosk 102 for facilitating a communication with the consultation center 112.

A variety of mechanisms (not shown) may be used for dispensing the cosmetic products from the dispensing unit 105 of the kiosk 102. Some mechanisms that may be suitable for use are described in U.S. Pat. No. 6,758,370; 2009/0306819; 2010/0025418; and 2010/0138037. In one embodiment, one or more cosmetic products may be selected/purchased by a consumer from the kiosk 102 following a personal consultation in which that cosmetic product was recommended to the consumer.

The semi-personal consultation may provide similar analysis and/or recommendations, which may similarly be provided via a user interface, a printable page, an email, a text message (e.g., SMS), and/or other protocols. The virtual consultation may be a consultation that is provided by a virtual consultant (e.g., a computer program). Depending on the particular embodiment, the virtual consultation may utilize the image capture device 104a, the display device 106, a calibration device 110, and/or the communications device 108. The virtual consultation may provide a similar analysis and/or recommendations as above, which may similarly be provided via a user interface, a printable page, an email, a text message (e.g., SMS), and/or other protocols. The user may utilize the calibration device 110 to facilitate adjustment of color settings and/or resolutions of images captured by the image capture device 104a (or other image capture device) to a predetermined image standard. This may provide the ability for consistent analysis of images, regardless of the current lighting characteristics, image capture device 104a characteristics, orientation of the consumer, etc.

In some embodiments, the kiosk 102 may be located at a retail store, a medical office, a mall, a public venue, and/or other location for analyzing and recommending cosmetic products and/or other products. However, persons of skill in the art will readily appreciate that the kiosk 102 may be used anywhere without departing from the scope and spirit of the present disclosure. For example, the kiosk 102 could be used in a doctor's office for diagnostic purposes and archiving patient data. The kiosk 102 may include the image capture device 104a, which may be configured with computing capabilities for acquiring images to be analyzed. In some instances, the kiosk 102 will be located remotely from consultation center 112, the user computing device 118, the foreign remote computing device 116, and the native remote computing device 114. For example, the devices, kiosk 102, and consultation center 112 might be located in different buildings, different cities, different states, or different countries.

More specifically, the image capture device 104a may include positioning equipment, lights, and a digital image generator such as a digital camera, an analog camera connected to a digitizing circuit, a scanner, a video camera, etc. The components of the image capture device 104a may be arranged at predetermined distances and at predetermined angles relative to one another to maximize the quality of the acquired image. For example, a positioning device for stabilizing the face of a person may include a chin rest and/or a forehead rest. In some embodiments, a digital image generator may be placed at a predetermined distance and at a predetermined angle relative to the positioning device.

While any digital or analog image capture device may be utilized, in some embodiments, an electromagnetic capture device may be utilized. In some embodiments, a High Definition camera with image capture and video capability may be utilized. The camera may contain features such as auto focus, optics and sensors. Specifically, the user may self-align the target substrate to be captured and/or measured for analysis. The target substrate may include a portion of a user's body, which may be a non-homogeneous/homogeneous shiny or matte substrate. In some embodiments, the target substrate comprises a consumer's face, skin, hair, etc.

The calibration device 110 may also be aligned with the image capture device 104a, at which point the user may trigger an electromagnetic measurement from the kiosk 102. In response, electromagnetic waves may be captured from the target substrate. Digital data may be determined from the captured electromagnetic waves. Based on the digital data, the user may be given an analysis, a treatment recommendation, and/or a product recommendation, which optionally could be purchased and/or dispensed from the kiosk 102. Items can also be ordered via a graphical user interface or call center agent and shipped to the consumer.

The image capture device 104a may also be configured to generate color data from the target substrate and one or more calibration devices (such as the calibration device 110), potentially in conjunction with a source, such as a xenon flash lamp, a linear flash, a ring flash or other light sources. The image capture device 104a may include charge coupled devices (CCDs), complementary metal oxide semiconductor (CMOS) devices, junction field effect transistor (JFETs) devices, linear photo diode arrays or other photo-electronic sensing devices. As also noted above, the target substrate may take any of a number of forms, including for example the skin, eyes or teeth of the user of the kiosk 102. The calibration device(s) may be stored within the kiosk 102 and dispensed there from and/or otherwise provided to the user and may include a sample with one or more regions whose light intensity characteristics are known.

As also illustrated in FIG. 1 and described in more detail below, the system may include the calibration device 110, which may be used in combination with the kiosk 102 and/or the user computing device 118. The calibration device 110 is easily portable, thereby enabling its use with the various devices that may be located remotely from each other. As discussed more fully hereafter, the calibration device 110 permits consultations and/or analysis of skin features using a variety of image capture devices connected to a variety of different computing/mobile devices in various locations while providing a more consistent image to the consumer and minimizing image variability due to differences in hardware and lighting. The calibration device may be dispensed from the kiosk 102, may be packaged with a cosmetic product and sold with the cosmetic product. The cosmetic product may be delivered to a consumer at residential location, such as for example a home where the user computing device is located, or may be distributed from a retail location.

The kiosk 102 is also connected to one or more output devices such as the display device 106, a printer, etc. The display device 106 may include a cathode ray tube (CRT), liquid crystal display (LCD), or any other type of display. Similarly, the display device 106 may be configured as a touch screen integrated with a video screen. The display device 106 may be configured to generate images, which may include operator prompts, preferences, options, and digital images of skin. The printer may include a laser printer, ink jet printer, or any other type of printer. The printer may be used to print out digital images and/or analysis results for the analyzed person.

According to some embodiments, the kiosk 102 may also include an electromagnetic source and a plurality of filters in a predetermined arrangement to be used in measuring an electromagnetic radiation response property associated with the target substrate. In such an embodiment, at least a portion of the waves generated by the source may be captured after the waves pass through a first polarized filter, reflect from the user, and pass through a second polarized filter arranged in a cross polar arrangement with respect to the first polarized filter. Additionally, the kiosk 102 may be configured to capture electromagnetic waves that pass through an attenuating filter and reflect from the one or more calibration devices. In such a circumstance, the digital data obtained may be used to calibrate and/or recalibrate the apparatus.

Figure 2A:
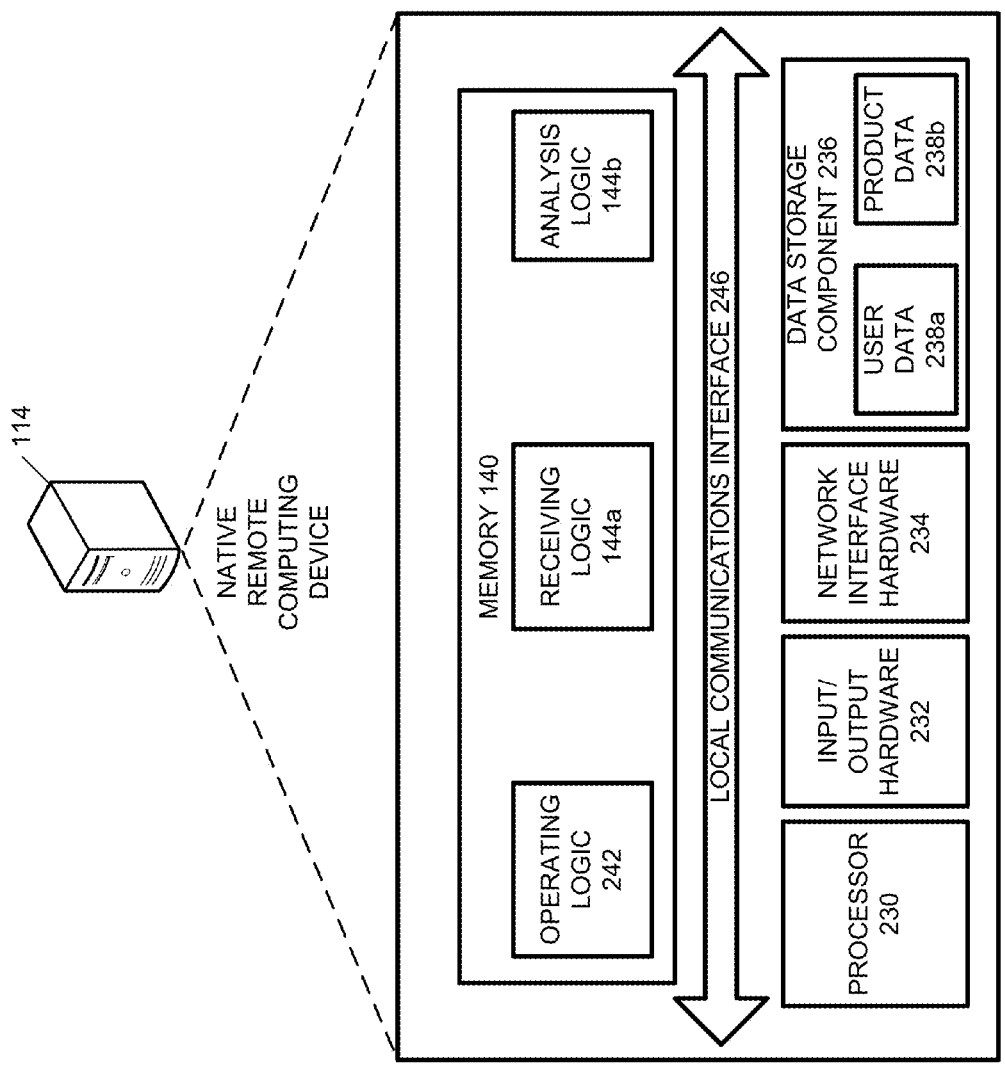
FIG. 2A depicts a computing device that may be utilized for providing a virtual consultation, according to some embodiments disclosed herein.

The kiosk 102 may additionally include a controller (and/or processor), which may include one or more processing units operatively coupled to one or more memory devices and one or more interface circuits (similar to that depicted for the native remote computing device 114 in FIG. 2A). In turn, the one or more interface circuits may be operatively coupled to one or more input devices, one or more output devices, an electromagnetic source and an electromagnetic capture device.

The one or more processing units may be of a variety of types, for example including microprocessors, microcontrollers, digital signal processors, specialized mathematical processors, etc. The memory device(s) may include volatile memory and/or non-volatile memory, and may be in the form of internal and/or external memory (e.g., flash cards, memory sticks, etc.). The memory device(s) may store one or more programs that control the function of the kiosk 102. The memory device(s) may also store data indicative of screen displays, bit maps, user instructions, personal identification information, demographic data, digitized images, color data, light intensity data, histogram data, and/or other data used by the apparatus and/or collected by the apparatus. The interface circuit may implement any of a variety of standards, such as Ethernet, universal serial bus (USB), and/or one or more proprietary standards.

The one or more input devices may be used to receive data, signals, identification information, commands, and/or other information from the user of the kiosk 102. For example, the one or more input devices may include one or more keys or buttons, a voice or gesture recognition system and/or a touch screen. The one or more output devices may be used to display or convey prompts, instructions, data, recommendations and/or other information to the user of the kiosk 102. For example, the one or more output devices may include the display device 106, other display devices, lights, and/or speakers. Additionally, depending on the particular embodiment, the kiosk 102 may be configured as a user-operated mobile device or system.

Additionally, the system 10 may include a consultation center 112 located remotely from the kiosk 102 and/or user computing device 118. The consultation center 112 may be coupled to the kiosk 102 and/or the user computing device 118, such that a user may conduct a semi-personal consultation with a consultant that is located at the consultation center 112. As an example, the user may access a user interface (such as those described below) to select a consultant, who will then be contacted utilizing the communications device 108. The consultation center 112 may include a plurality of audio, video, and/or data communication hardware and software and may receive (or initiate) the call to begin the consultation with the user. The consultant may control at least a portion of the functionality of the kiosk 102 and/or user computing device 128 to remotely capture images, dispense the calibration device 110, and/or perform other functions.

Depending on the particular embodiment, user interfaces and/or other data may be provided by the kiosk 102, user computing device 118, and/or a native remote computing device 114. The native remote computing device 114 may include a memory component 140, which stores receiving logic 144a, analysis logic 144b, and/or other logic for facilitating performance of the consultation. With this logic, the native remote computing device 114 may send user interface data to the kiosk 102 and/or user computing device 118. Additionally, the native remote computing device 114 may determine whether the consultation is a personal consultation, semi-personal consultation, and/or virtual consultation. If the consultation is a semi-personal consultation, the native remote computing device 114 may interact with the consultation center 112 to facilitate the consultation. If the consultation is a virtual consultation, the native remote computing device 114 may perform the consultation analysis and/or perform other functions. More specifically, while in some embodiments, the kiosk 102 and/or user computing device 118 may include logic and/or hardware for providing user interfaces, performing the analysis, and providing treatment and product recommendations, in some embodiments, the native remote computing device 114 may provide this functionality.

Depending on whether the consultation is a personal consultation, a semi-personal consultation, and/or a virtual consultation, the native remote computing device 114 may access the consultation center 112, as described above with regard to the kiosk 102. Additionally, the native remote computing device 114 and/or the user computing device 118 may access the foreign remote computing device 116 to retrieve data from a previous consultation, share the consultation with friends and/or perform other functions.

Also included is a foreign remote computing device 116. The foreign remote computing device 116 may be configured as a computing device for storing data. As an example, the foreign remote computing device 116 may be configured as a social network server, a storage server, a user computing device, a consultation server, and/or other device for performing the described functionality. As such, the kiosk 102 and/or user computing device 118 may prompt the user to save the data from the consultation to the foreign remote computing device 116 for subsequent retrieval by other devices, such as the kiosk 102, the native remote computing device, and/or the user computing device 118. If the user is prompted to save the data on the foreign remote computing device 116, such as a social network, the kiosk 102 may have a dedicated profile page on the social network to upload the consultation data. The consultation data may be tagged for the user, so that the data is also included in the user's profile page. In order to protect privacy, the data may be redacted on any public posting of the data and/or provided so that only the user may access the data. Similarly, in some embodiments, the kiosk 102 and/or the user computing device 118 can upload the consultation data directly to the user's profile page. In such a scenario, the kiosk 102 and/or the user computing device 118 may receive the user's login information.

As an example, if the user is performing a skin treatment, an image of the user's face may be captured. After the consultation, the user may wish to store the image, so that the user can compare this image with past and/or future images. As such, the kiosk 102, the user computing device 118, the native remote computing device 114, and/or the consultation center 112 may facilitate sending and/or storing this data. Depending on the particular embodiment, the data may be sent to the native remote computing device 114, the foreign remote computing device 116, and/or a user computing device 118.

Also included in the embodiment of FIG. 1 is the user computing device 118. The user computing device 118 may include a personal computer, notebook, mobile phone, smart phone, laptop, tablet, and/or other device for communicating with other devices on the network 100. The user computing device 118 may incorporate an image capture device 104b that is different from the image capture device 104a utilized by the kiosk 102. The image capture device 104b may include some, if not all the same hardware, software, and/or functionality as described above with respect to the image capture device 104a. The image capture device 104b and may be utilized with the user computing device 118 as a stand-alone device that is connectable to the user computing device 118 by a cable (e.g., a USB cable or video cable), and/or may be integral to or otherwise hard wired to the user computing device 118.

Additionally, the user computing device 118 may be configured as a general purpose computer and/or may take the form of a personal computer, a mobile phone, a smart phone, a tablet, a laptop, and/or other type of computing device. The user computing device 118 may provide similar functionality as the kiosk 102 and thus permit the user to send a request for and receive consultations at a wide variety of locations. As such, the user computing device 118 may be configured to log into the native remote computing device 114 to perform analysis. More specifically, the user may access the native remote computing device 114 to perform a consultation or to complete a previously initiated consultation.

Example Devices

FIG. 2A depicts the native remote computing device 114 that may be utilized for providing a consultation, according to embodiments disclosed herein. Depending on the particular embodiment, the native remote computing device 114 (and/or other computing devices depicted in FIG. 1) may be configured as a general purpose computer programmed to implement the functionality described herein. Similarly, the native remote computing device 114 may be an application-specific device designed to implement the functionality described herein. In the illustrated embodiment, the native remote computing device 114 includes a processor 230, input/output hardware 232, network interface hardware 234, a data storage component 236 (which stores user data 238a, product data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the native remote computing device 114 and/or external to the native remote computing device 114.

Additionally, the memory component 140 may store operating logic 242, the receiving logic 144a, and the analysis logic 144b. The receiving logic 144a and the analysis logic 144b may each include a plurality of different pieces of logic, each of which may be embodied as a computer program, firmware, and/or hardware, as an example. A local communication interface 246 is also included in FIG. 2A and may be implemented as a bus or other communication interface to facilitate communication among the components of the native remote computing device 114.

The processor 230 may include any processing component operable to receive and execute instructions (such as from the data storage component 236 and/or the memory component 140). The input/output hardware 232 may include and/or be configured to interface with a monitor, positioning system, keyboard, touch screen, mouse, printer, image capture device, microphone, speaker, gyroscope, compass, key controller, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, Bluetooth™ hardware, WiMax card, mobile communications hardware, router(s) and/or other hardware for communicating with other networks and/or devices. From this connection, communication may be facilitated between the native remote computing device 114 and/or other computing devices.

The operating logic 242 may include an operating system and/or other software for managing components of the native remote computing device 114. Other functionality is also included and described in more detail, below.

It should be understood that the components illustrated in FIG. 2A are merely exemplary and are not intended to limit the scope of this disclosure. While the components in FIG. 2A are illustrated as residing within the native remote computing device 114, this is merely an example. In some embodiments, one or more of the components may reside external to the native remote computing device 114. It should also be understood that while the native remote computing device 114 in FIG. 2A is illustrated as a single device; this is also merely an example. In some embodiments, the receiving logic 144a and/or the analysis logic 144b may reside on different devices. Additionally, while the native remote computing device 114 is illustrated with the receiving logic 144a and the analysis logic 144b as separate logical components, this is also an example. In some embodiments, a single piece of logic may cause the native remote computing device 114 to provide the described functionality.

Figure 2B:
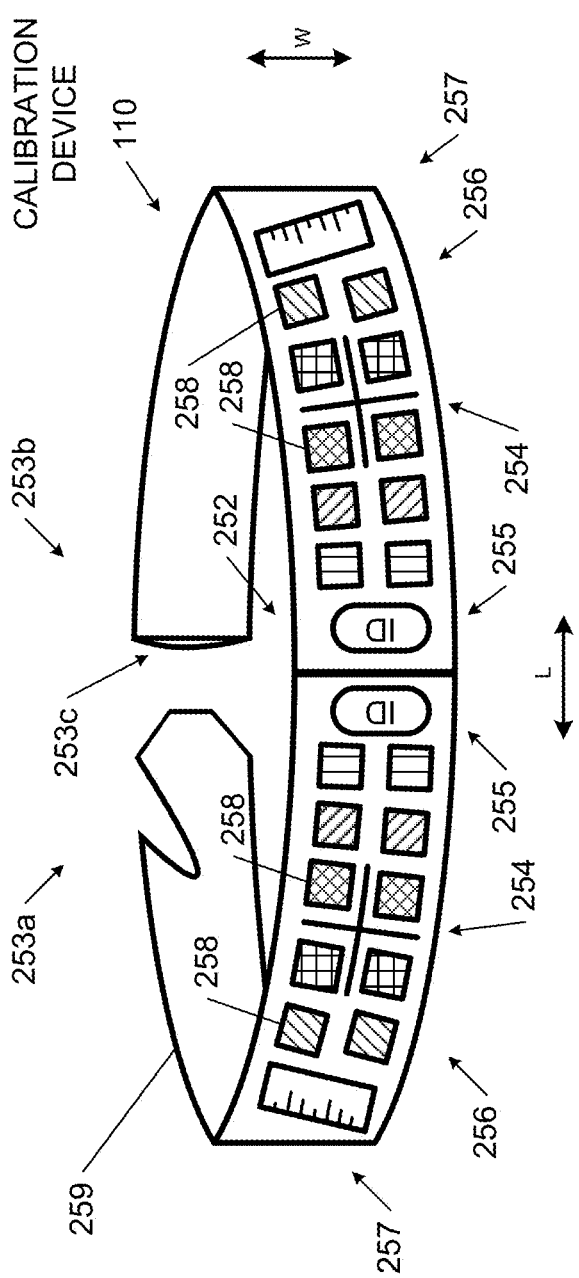
FIG. 2B depicts a calibration device that may be utilized for providing a color calibration of images for a consultation, according to some embodiments disclosed herein.

FIG. 2B depicts one embodiment of a calibration device 110 that may be utilized for providing a color calibration of images for a consultation. The calibration device 110 may be configured as a headband formed from a flexible, elongate strip of material 259 having a first end 253a, a second end 253b, and one or more slits 253c adjacent the second end 253b for receiving the first end 253a. In some embodiments, the strip of material 259 has a width W from about 0.5 cm to about 6 cm and a length L from about 40 cm to about 100 cm. In some embodiments, the headband has a width W from about 2 cm to about 4 cm and a length L from about 60 cm to about 80 cm. By inserting the first end 253a into the slit 253c, the strip of material 259 can be formed into an adjustable ring or headband that may be sized to accommodate various users.

The headband includes alignment indicator 252, at least one color correction region 256 (which may include a first color correction region 256, a second color correction region 256, etc.), an identifier 255, a measurement component 257, at least one resolution indicator 254, and/or other components. The alignment indicator 252 may generally bifurcate the headband. In one embodiment, the alignment indicator 252 is provided in the form of a substantially vertical stripe, which a user of the headband can align with the mid-point of their face during use. The alignment indicator 252 can be provided in a wide range of sizes, shapes, and colors. In some embodiments, the color correction region 256 includes a plurality of color chips 258 having at least one predetermined chip color, each chip color being a different color.

Additionally, the measurement component 257, and/or resolution indicator 254 (which may be embodied as green cross shapes on either side of the alignment indicator 252) are arranged on opposite sides of the alignment indicator 252. In some embodiments, the color correction region 256, the measurement component 257, and/or resolution indicator 254 are symmetrically arranged on opposite sides of the alignment indicator 252. The calibration device 110 may be made from a wide variety of materials, including paper, cardboard, and plastics.

Additionally, in some embodiments the calibration device 110 may be constructed of a predetermined background color that is predicted to be absent from the target substrate. Similarly, in some embodiments, the background color is selected based on a predicted contrast in the LAB color space. This color may include blue, green, and/or other colors.

During the consultation at the kiosk 102 and/or at the user computing device 118, the user may wear the calibration device 110 on his/her head with the alignment indicator 252 aligned near the mid-point of the subject's face or subject's forehead so that color correction regions 256 are positioned on either side of the face. In many instances, it may be desirable to capture an image of the face from an oblique angle thereto (such as at a 45 degree angle), as seen for example in FIG. 8. In these instances, having a color correction area positioned on either side of the mid-point of the face permits an image capture at any oblique angle on either side of the face without having to reposition the headband so that a color correction region 256, resolution indicator 254, and/or measurement component 257 are within the field of the captured image.

The image may be captured at an oblique angle to more provide visual access to the cheek and eye area of the target substrate with a reduced effect from shadows and distortion. In some embodiments, the cheek and eye areas of the face provide a suitable area for wrinkle and spot detection, the oblique angle may be utilized.

Generally speaking, the user's hair may be pulled back or otherwise arranged so that it does not cover the color correction region 256, the resolution indicator 254, and/or measurement component 257, and the user's head should be rotated from about 30 degrees to about 60 degrees relative to the image capture device at the time of taking the image (e.g., somewhere between a profile or side image and an image taken looking directly into the image capture device).

As discussed in more detail below, the components of the calibration device 110 may be utilized for the kiosk 102, user computing device 118, and/or native remote computing device 114 to adjust imagery to provide a consistent analysis of the target substrate.

As illustrated, the color correction regions 256 may include a plurality of color chips in the form of squares (or other shapes) of varying colors. Additionally, the alignment indicator 252 and/or other markings on the calibration device 110 may be different colors.

While each of the plurality of color chips of the color correction regions 256 are illustrated as being square in shape; this is not a requirement of the calibration device 110. Rectangular areas and/or other shapes may be utilized so as to be used in the calibration device 110 of the present disclosure. According to certain embodiments, the calibration device 110 may also include instructions disposed thereon. Depending on the particular embodiment, the instructions may be disposed on a backside of the calibration device 110. As described more fully hereafter, in use, the known colors on the headband may be compared to color values captured in an image of the headband during a consultation. The facial image can then be color corrected based upon the difference between the known color values of the color correction region 256 of the calibration device 110 and the color values of the color correction region 256 captured in an image by the image capture device 104a, 104b. Use of the same type of calibration device 110 with multiple different image capture devices 104a, 104b provides a common color calibration standard that enables a user's image to be captured by a variety of different image capture devices and then color corrected so that the corrected image most closely resembles the true colors of the user's face regardless of what type of image capture device is used. This further enables more meaningful tracking of user's experience over time with one or more cosmetic products using one or more devices.

Figure 2C:
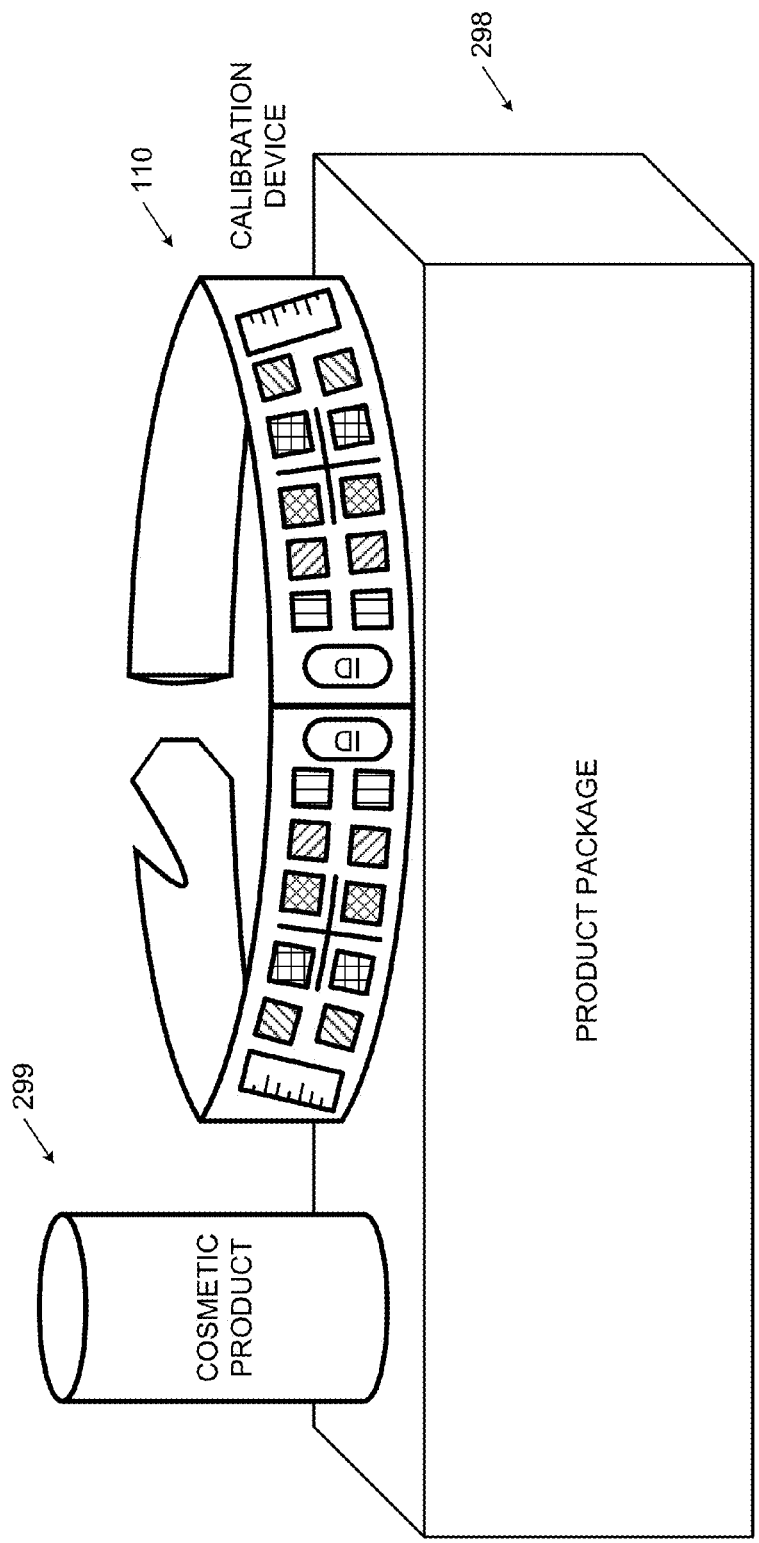
FIG. 2C depicts a product package, which may include a calibration device and a cosmetic product, according to some embodiments disclosed herein.

FIG. 2C depicts a product package 298, which may include a calibration device 110 and a cosmetic product 299, according to some embodiments disclosed herein. As illustrated, the calibration device 110 may be included as part of a kit. The product package 298 may also include a cosmetic product 299, which may be specifically designed to treat a condition of a subject. However, in some embodiments, the product 299 may simply be a general treatment product that applies to all subjects. Depending on the particular embodiment, the calibration device 110 may be included inside the product package 298 and/or may be adhered to a wall of the product package 298.

Example User Interfaces

Figure 3:
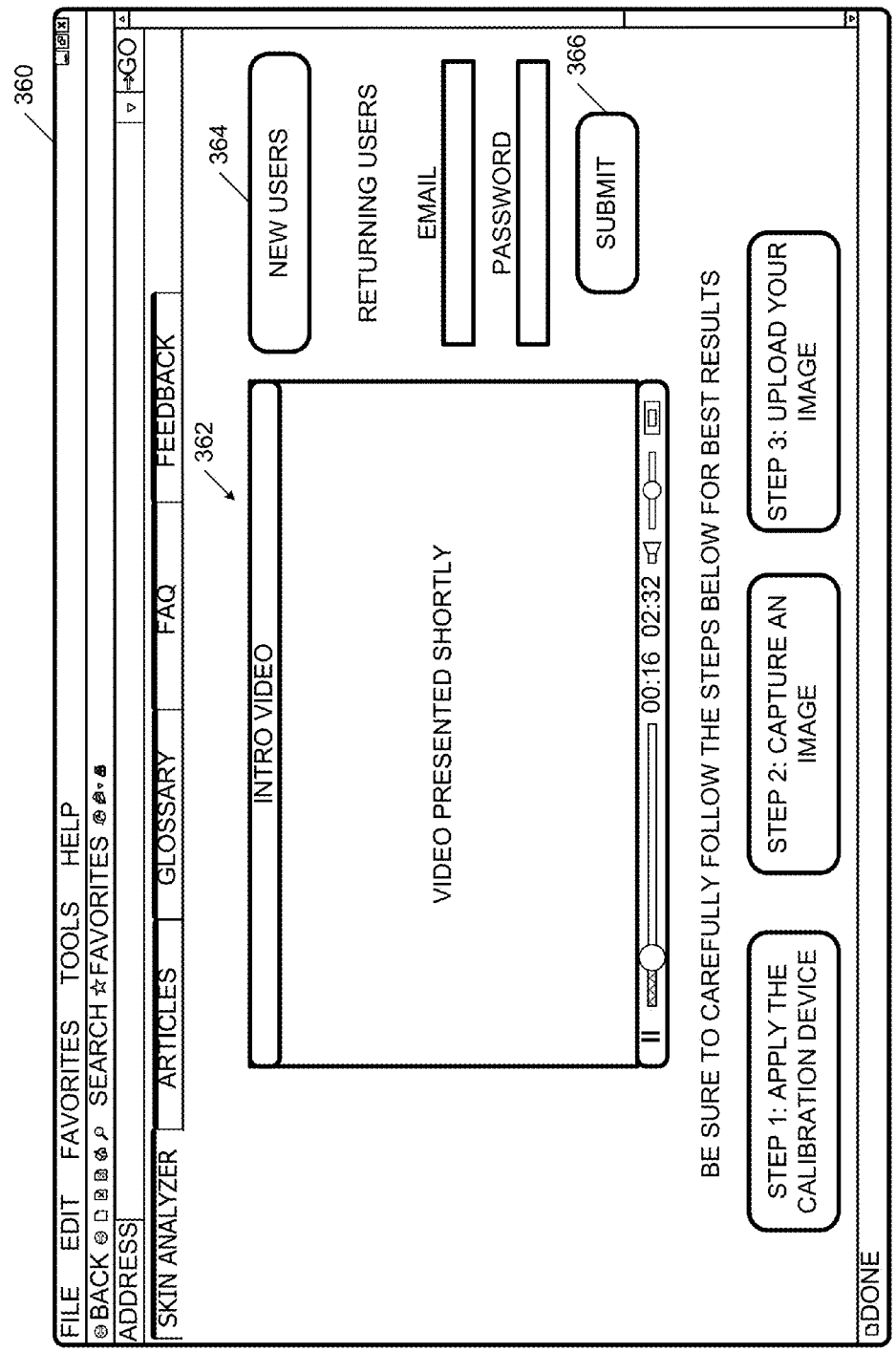
FIG. 3 depicts a user interface for providing a product and/or treatment consultation, according to some embodiments disclosed herein.

FIG. 3 depicts one embodiment of a user interface 360 for providing a product and/or treatment consultation, such as in the computing environment from FIG. 1. As illustrated, the user interface 360 includes a video area 362, a "new users" option 364, and a "submit" option 366. The video area 362 may provide the user with one or more instructional videos for performing an analysis as described herein. If the user is new to the service, the user may select the new users option 364, which provides additional options for creating an account, such as those depicted in FIG. 4. If the user is a returning user, the user may enter the requested account information and select the submit option 366. Additional options may also be provided, such as an "articles" option, a "glossary" option, an "FAQ" option, a "feedback" option, and/or other options.

As discussed above, depending on the particular embodiment, the user interface 360 (and/or other user interfaces described herein) may be provided at the kiosk 102 and/or at the user computing device 118. It will be appreciated that a wide variety of user interface features, functionality, options, and layouts can be provided, deleted, or altered from what is shown and described in FIGS. 3-15.

Figure 4:
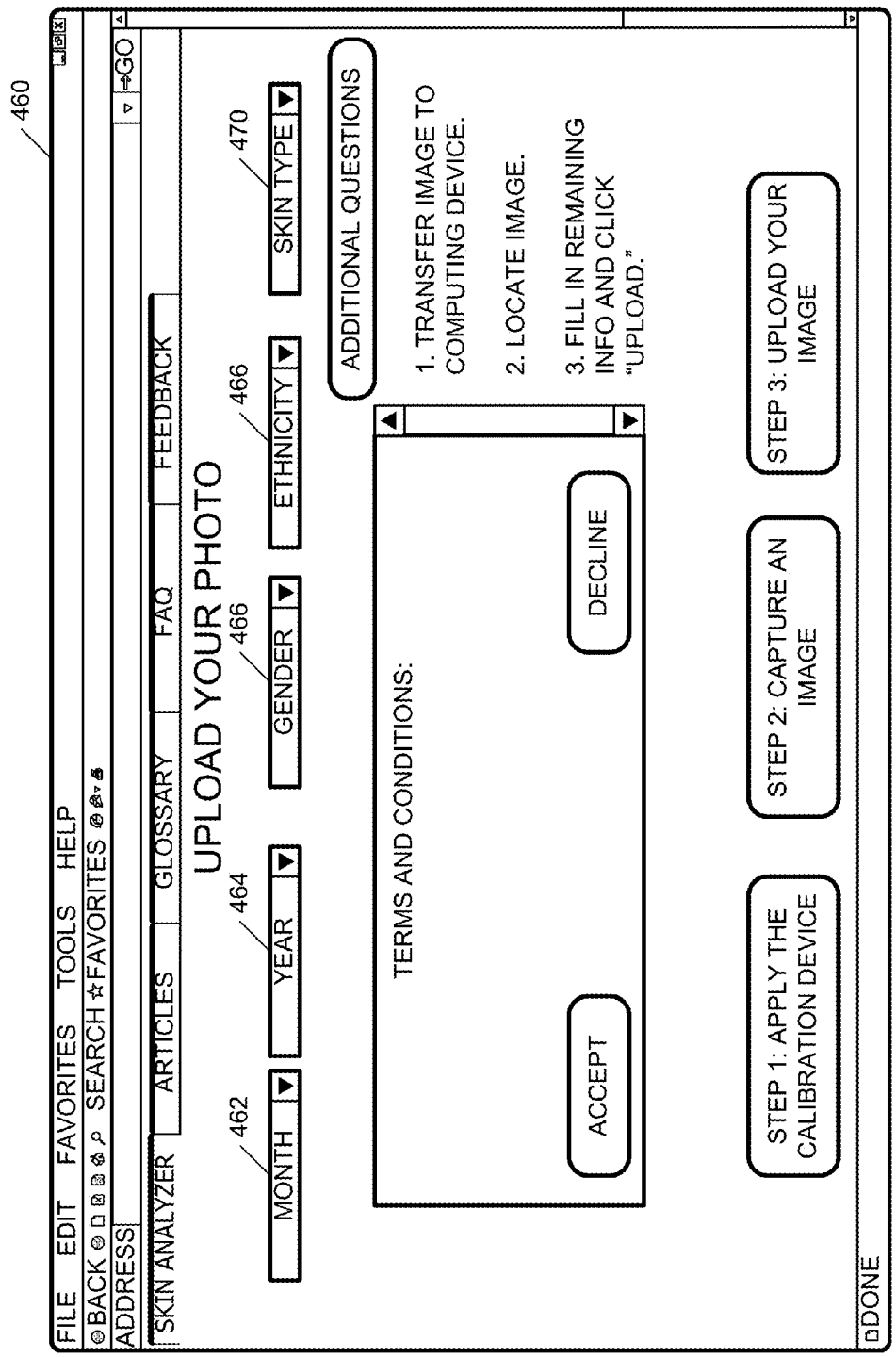
FIG. 4 depicts a user interface for creating a profile for performing a product and/or treatment consultation, according to some embodiments disclosed herein.

FIG. 4 depicts a user interface 460 for creating a profile for performing a product and/or treatment consultation, according to some embodiments disclosed herein. As illustrated, the user interface 460 may be accessed in response to selecting the "new users" option 364 from FIG. 3. More specifically, upon selecting the "new users" option 364, the user may be prompted to create a profile. As part of creating a profile, the user may be asked for the month and year of birth in areas 462 and 464. The user may be asked his/her gender in area 466, his/her ethnicity in area 468, and his/her skin type in area 470. Additional questions, such as contact information, billing information, etc. may be asked of the user in response to selection of the additional questions option 472.

It should be understood that the data in FIG. 4 is collected to categorize the subject into a subject type. More specifically, subjects in certain geographic areas may receive similar types and amounts of sunlight. Similarly, subjects of similar ages, skin types, and ethnicities may additionally be expected to have similar skin, hair, lip, etc. characteristics. Further, once the subject is analyzed as described herein, the subject's information may be stored for comparison with other subjects.

Figure 5:
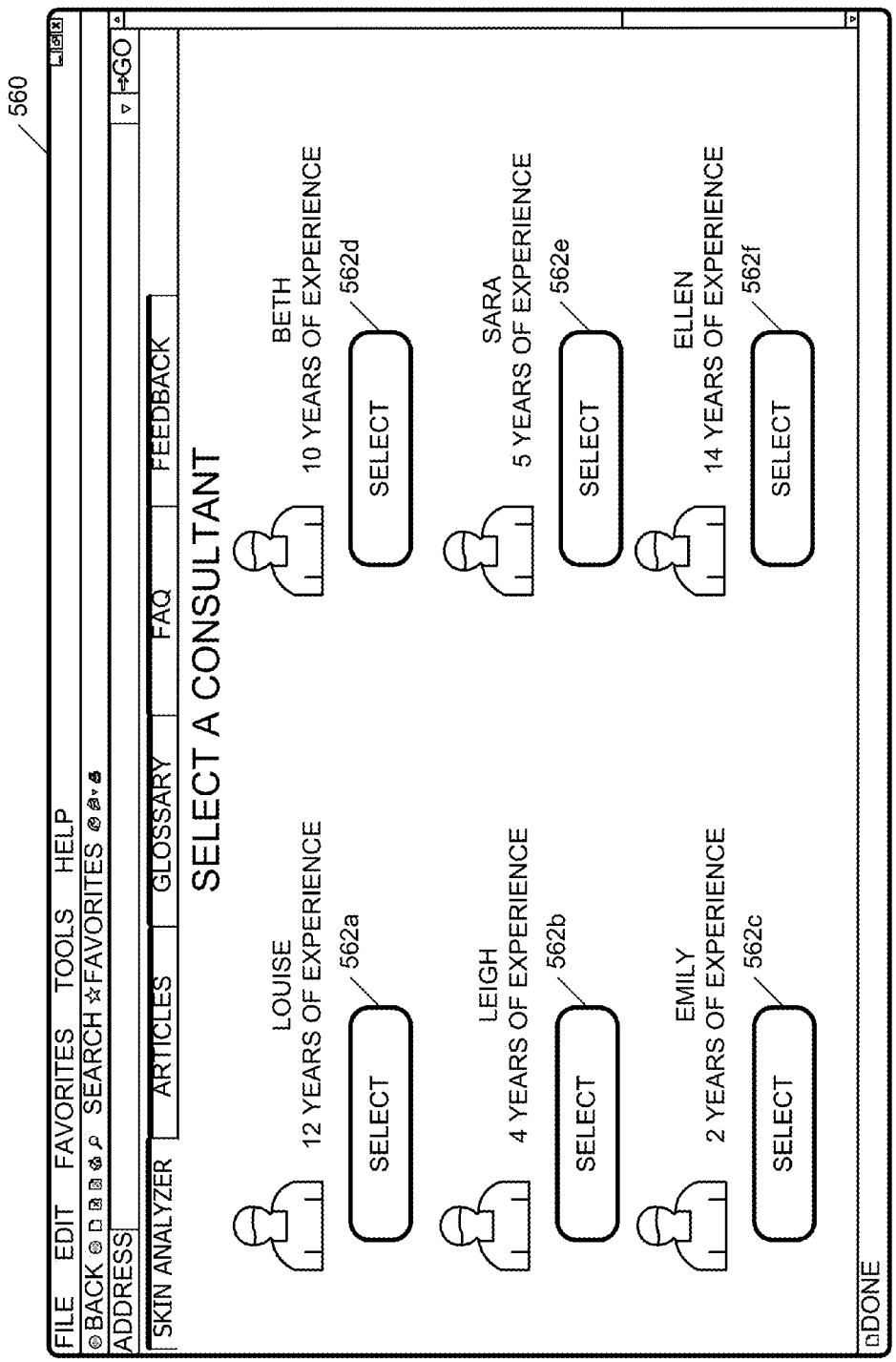
FIG. 5 depicts a user interface for selecting a consultant, according to some embodiments disclosed herein.

FIG. 5 depicts one embodiment of a user interface 560 for selecting a consultant. As illustrated, the user may select one of a plurality of different consultants, such as via selection of an option 562a-562f. Additionally, as discussed above, the consultants may be a live person (e.g. physically at the kiosk 102 or user computing device 118), a remote person (e.g., accessible via the consultation center 112), and/or a virtual person (e.g., software being executed to simulate a real person). Depending on the embodiment, an indication of the type of consultation may be provided in the user interface 560.

Figure 6:
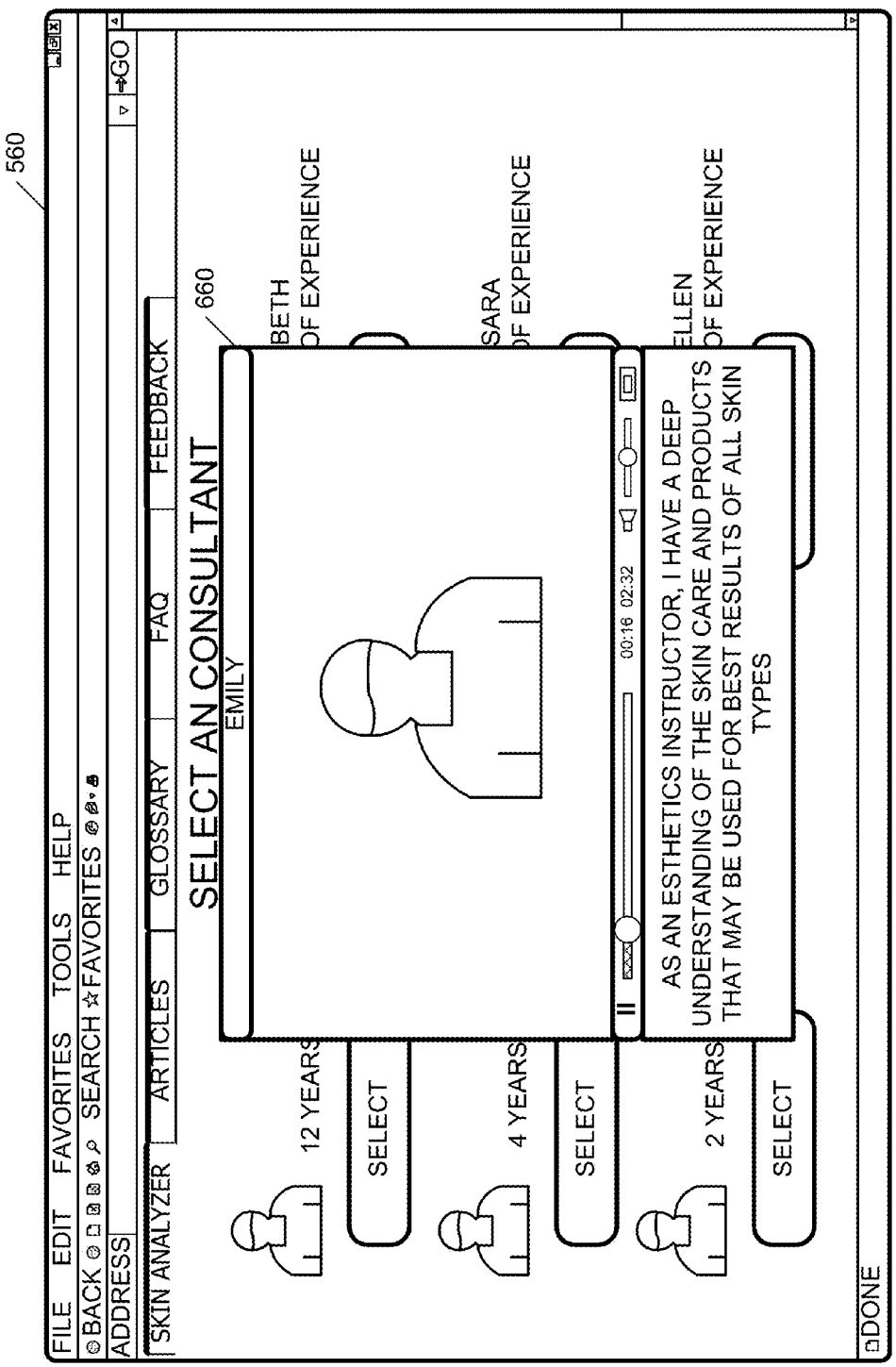
FIG. 6 depicts a user interface for viewing a profile of a selected consultant, according to some embodiments disclosed herein.

FIG. 6 depicts one embodiment of a user interface 660 for viewing a profile of a selected consultant, according to embodiments disclosed herein. As illustrated, in response to selection of the option 562c from FIG. 5, the selected consultant may be contacted for a consultation. If the selected consultant is physically present at the kiosk 102 and/or user computing device 118, the consultant may be contacted and the consultation may be performed accordingly in person. If the selected consultant is remotely located, the kiosk 102 and/or user computing device 118 may contact (or be contacted by) the consultant via the consultation center 112.

As such, if the selected consultant is a remotely located person or a virtual consultant, the user interface 1150 may be provided to include a video communication stream to conduct the consultation.

Figure 7:
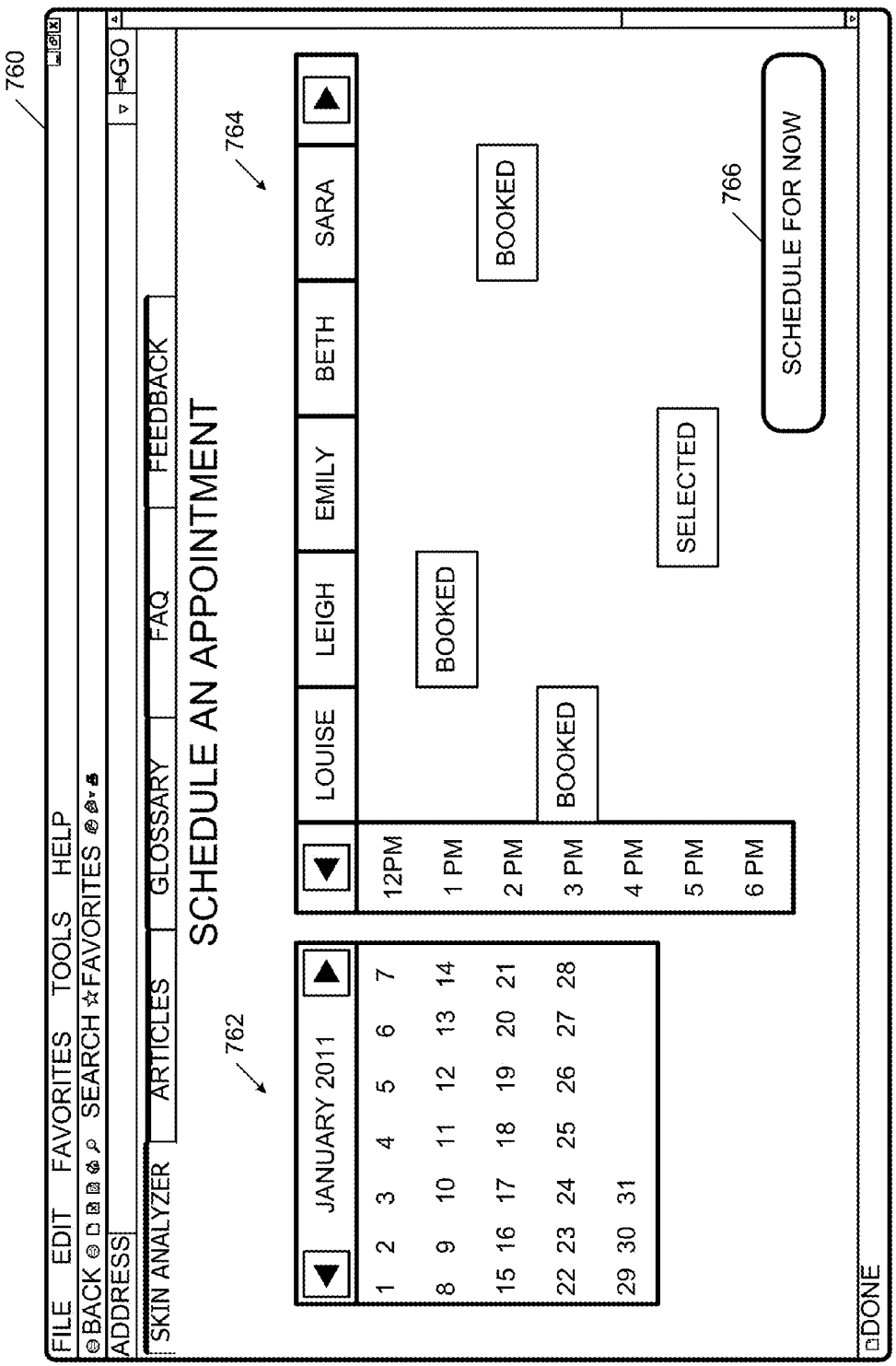
FIG. 7 depicts a user interface for scheduling a consultation, according to some embodiments disclosed herein.

FIG. 7 depicts one embodiment of a user interface 760 for conducting a consultation. As illustrated, in response to creating a profile and/or logging into the service, the user interface 760 may be provided. More specifically, the user interface 760 may include a day calendar 762 for the user to select a day for the consultation, as well as a time calendar 764 for selecting a time for the consultation. By selecting a schedule option 766, the consultation may be scheduled. When the time for the consultation approaches, the user may be contacted for a reminder via for example, telephone call, email, text message, etc.

Figure 8:
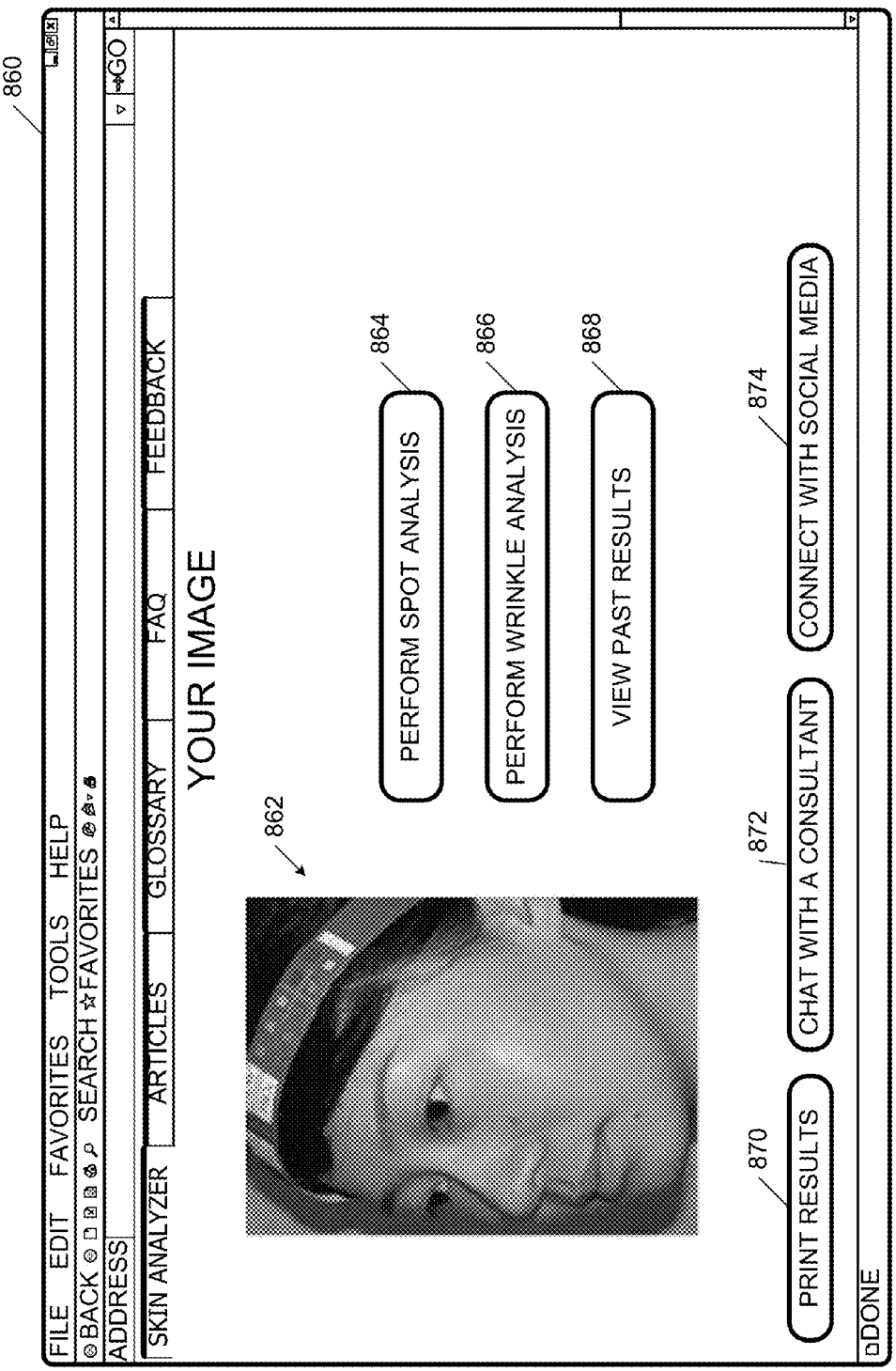
FIG. 8 depicts a user interface for beginning a consultation on an uploaded image, according to some embodiments disclosed herein.

FIG. 8 depicts one embodiment of a user interface 860 for uploading imagery to perform a consultation. As illustrated, the user may capture an image using the image capture device 104a, 104b and facilitate upload of that image for use in the consultation. Depending on the particular image capture device, the lighting, and/or other factors, the image may differ from other images that may be uploaded. Accordingly, the native remote computing device 114 (and/or other computing device described herein) may alter the uploaded image to predetermined characteristics. This image 862 may then be provided to the user. Also included in the user interface 860 are a "perform spot analysis" option 864, a "perform wrinkle analysis" option 866, a "view past results" option 868, a "print results" option 870, a "chat with a consultant" option 872, and a "connect with social media" option 874.

In response to selection of the perform spot analysis option 864, the native remote computing device 114 and/or other computing device may perform an analysis of the image 862 and may identify facial characteristics, such as spots. Similarly, upon selection of the perform wrinkle analysis option 866, wrinkles and/or other facial characteristics may be determined from the image 862. In response to selection of the view past results option 868, images, analysis, product recommendations, and/or other data related to previous consultations may be provided.

Additionally, in response to selection of the print results option 870, the user interface 860 may be sent to a printer. In response to selection of the chat with a consultant option 872, a consultant (such as those depicted in FIG. 5) may be connected to the user for consultation. In response to selection of the connect with social media option 874, the images and/or data may be sent to a social network for posting and/or storage. Other posting and storage options may also be provided.

Figure 9:
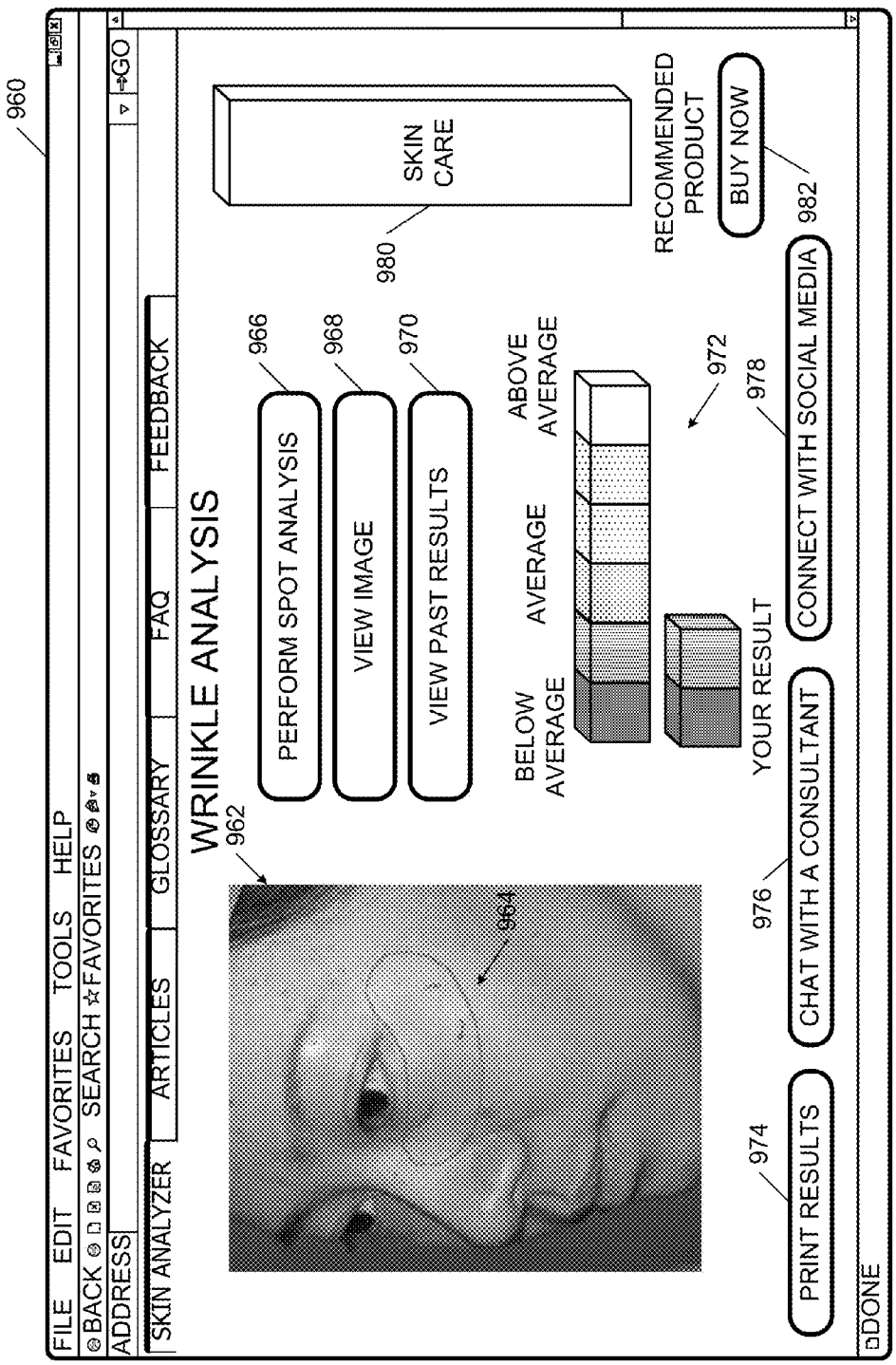
FIG. 9 depicts a user interface for identifying wrinkles on the target substrate, according to some embodiments disclosed herein.

FIG. 9 depicts a user interface for identifying wrinkles on the target substrate, according to some embodiments disclosed herein. As illustrated, the user interface 960 may be configured to display an image 962 of the user that has been altered from the version captured by the image capture device 104a, 104b. While the captured image may include the target substrate of the user (e.g., the right or left cheek and around the eye) and the calibration device 110, the image 962 may be adjusted to provide only the target substrate. Additionally, other image processing may be performed, which may include a color correction, spatial image adjustment, and facial characteristic analysis to identify wrinkles and/or other facial characteristics, which have been marked with indicators 964.

Referring again to FIG. 9, the user interface 960 may also include a "perform spot analysis" option 966, a "view image" option 968, a "view past results" option 974, a "chat with a consultant" option 976, and a "connect with social media" option 978. The user interface 960 also includes an analysis scale 972 for indicating to the user how healthy looking the target substrate is. The user interface 960 also provides a recommended product 980, as well as a "purchase" option 982 to purchase the recommended product.

Figure 10:
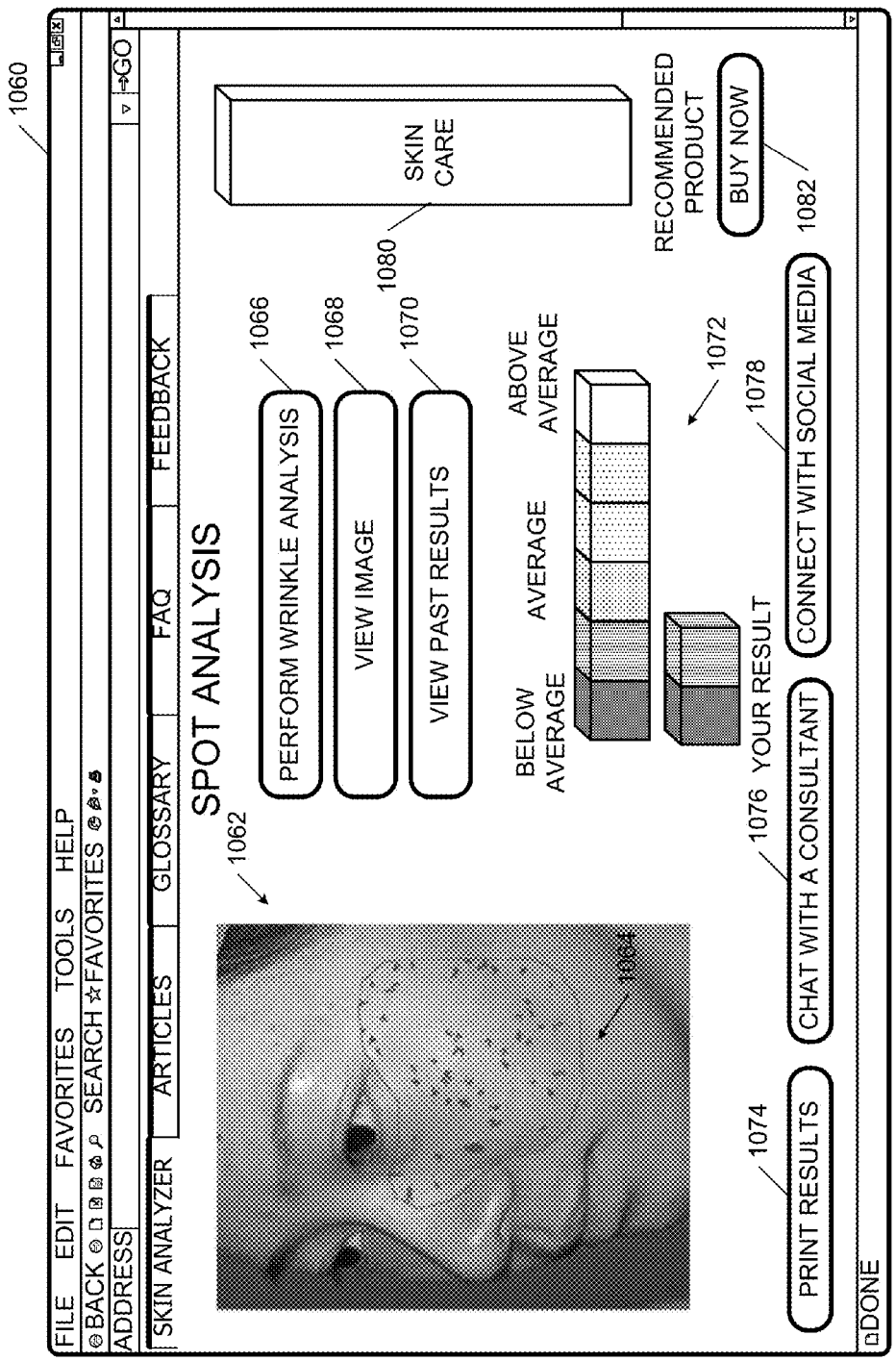
FIG. 10 depicts a user interface for identifying spots on the target substrate, according to some embodiments disclosed herein.

The perform spot analysis option 966 may provide the user with a different analysis of the uploaded image, as described with regard to FIG. 10. The view image option 968 may provide the user with the original uploaded image. The view past results option 970 may provide the user with results from previous consultations, which may have been stored by the native remote computing device 114, the foreign remote computing device 116, the kiosk 102, the user computing device 118, and/or the consultation center 112. The print results option 974 may print the image, analysis, and/or other data of the analysis provided in the user interface 960. The chat with a consultant option 976 may provide the user with access to one or more consultants, as discussed above. The connect with social media option 978 may provide the user with options for storing and/or retrieving data from a social network. The recommended product 980 may be determined based on the current and/or past analysis, as well as the age, skin type, allergies, zip code, etc. of the subject. The buy now option 982 may allow the user to purchase the recommended product and/or view other products directly. Additionally, the recommended product 980 may be sold and/or provided with the calibration device 110 in the form of a kit.

It should also be understood that in some embodiments, the user may desire a change to his/her appearance and/or health. In such embodiments, a user interface may be provided to the user for indicating the change that the user wishes to make. As an example, if the subject wishes to change his/her hair color, the user may indicate this change in one of the user interfaces. In response, the kiosk 102, user computing device 118, consultation center 112, native remote computing device 114, and/or foreign remote computing device 116 can provide the user with a pallet of images of the subject with the different hair colors that are possible with the subject's target substrate. The user may then select the desired color and the products and/or treatment may be provided for creating the desired result.

It should also be understood that while the user interfaces depicted herein may be configured to facilitate the communication of data among the native remote computing device 114, the consultation center 112, the kiosk 102, the foreign remote computing device 116, and/or the user computing device 118. More specifically, in some embodiments, the user computing device 118 may receive user input, which is sent to the native remote computing device 114. The native remote computing device 114 may send the data to the consultation center 112 for viewing by the consultant. The consultant may then discuss the results with the user.

FIG. 10 depicts a user interface 1060 for identifying spots on the target substrate, according to some embodiments disclosed herein. As illustrated, once the image of the user has been altered for consistency, an analysis may be performed to determine at least one facial characteristic and other issues in the target substrate. More specifically, in FIG. 10, the image 1062 (a non-limiting example of an altered image) may indicate the areas of spots with indicators 1064 on the user's face.

Also included in the user interface 1060 are a "perform wrinkle analysis" option 1066, a "view image" option 1068, a "view past results" option 1070, an analysis scale 1072, a "print results" option 1074, a "chat with a consultant" option 1076, and a "connect with social media" option 1078. The perform wrinkle analysis option 1066 may be configured to send the user back to the user interface 960. The view image option 1068 may provide the user with an unaltered version of the image 1062. The view past results option 1070 may provide the user with analysis and/or other data from previous consultations. The print results option 1074 may send at least a portion of the data from the user interface 1060 to a printer. The chat with a consultant option 1076 may place the user in contact with a consultant, as discussed above. The connection with social media option 1078 may allow the user to save, post, upload, and/or perform other interactions with a social network.

Also included is a recommended product 1080, which has been determined as being beneficial based on the identified facial characteristics and the user's other information. A "purchase" option 1082 may provide the user with the ability to immediately purchase the recommended product 1080.

It should be understood that while spots are the depicted defect in FIG. 10, this is merely an example. More specifically, any type of condition may be identified, depending on the particular embodiments. Examples for skin include moles, freckles, pores, wrinkles, spots, etc. Examples for hair include split ends, gray hair, thinning hair, etc. Some methods suitable for use with the present invention for analyzing skin images are described in U.S. Pat. No. 6,571,003.

It should also be understood that, as illustrated in FIGS. 9 and 10, in some embodiments, an altered image that is based on the original uploaded image and the location of the defect areas may be provided. The altered image visually identifies the plurality of defect areas located in the uploaded image by electronically altering the color of a plurality of pixels substantially in the area containing the skin defect (e.g., on or around the defect area) to at least one color visually distinct from the skin color of the uploaded image. For example, the skin color of each pixel in the defect area may be shifted to a shade of blue to create a transparent overlay. In another example, a circle could be drawn around each of the facial characteristics to visually identify the location of the spots. Other alterations may also be provided.

Additionally, a numerical severity may be associated with the defect areas. In one embodiment, a color content associated with the defect area may be subtracted from the color content of the area immediately surrounding the defect area. For example, if the pixels used to create a red spot have a red content of 60% and the pixels used to create the surrounding skin color have a red content of 10%, then the numerical severity associated with the red spot defect in this example may be determined to be 50. Similarly, in some embodiments, the number of geometric coordinates necessary to cover the defect area is the numerical severity. For example, if a detected pore covers 30 pixels, then the numerical severity associated with that pore may be determined to be 30. The severity of multiple instances of a particular defect type may be aggregated. For example, multiple severities may be summed or averaged.

Further, the aggregated severity may be normalized, based on human perception coefficients. For example, if it is determined in a clinical study that red spots are twice as noticeable as brown spots, the aggregated severity associated with the red spot analysis may be doubled. Alternatively, in this example, the aggregated brown spot severity may be halved. Of course, a person of skill in the art will readily appreciate that more than two defect types may be normalized.

A percentile for the normalized severity may additionally be determined using data associated with a certain population of people. The population data used may be specific to the analyzed person's age, geographic location, ethnic origin, or any other factor. For example, if 55% of a sample group of people in the analyzed person's age group had a normalized severity for the current defect type below the analyzed person's severity, and 45% of the sample group had a severity above the analyzed person's severity, then a percentile of 55 or 56 is determined.

When there are no more defect types to process, an overall skin severity and an overall percentile may be calculated. The overall skin severity may be an aggregation of the plurality of individual skin defect severities. For example, the severities determined by each defect may be summed or averaged. The overall percentile may be calculated as described above for the individual skin defect percentiles; however, a different data set representing overall severities of a population of people may be used. Again, the population data may be selected based on the analyzed person's demographics.

In addition to an overall skin severity based on the aggregation of individual skin defect severities, one or more overall skin characteristics may be determined. An overall skin characteristic may not depend on the detection of any individual skin defects. For example, an overall smoothness/roughness magnitude may be determined. Such a determination may include certain skin defects (e.g., analyze entire image or sub-image) or it may exclude certain skin defects (e.g., do not analyze pixels in the hyper-pigmentation defect areas).

It should also be understood that while the examples depicted in FIGS. 9 and 10 illustrate analysis of the image as a whole, in some embodiments sub-images may be determined. A sub-image is a portion of the originally acquired image upon which analysis will be performed. By eliminating a portion of the acquired image from the analysis process, fewer errors occur. For example, by excluding consideration of the eyes and nose from the analysis process, an incorrect determination that a large discoloration of the skin is present is avoided.

As an example, a decision may be made to use automatic or manual sub-image determination. In one embodiment, this decision is made by the user. However, in some embodiments the selection may be automatically determined. In such an instance, the native remote computing device 114 (and/or other computing device) may analyze or partially analyze the image automatically, and based on the results of that analysis, a decision is made regarding whether to use automatic or manual sub-image determination. For example, if the automatic sub-image determination includes a result indicative of a confidence level (e.g., how sure is that a nose has been found), and that confidence result is below some predetermined threshold, then a manual sub-image determination may be performed.

If a manual sub-image determination is selected, a decision may be made to use prompted or unprompted sub-image determination. This decision may be made by the user. If unprompted sub-image determination is selected, the operator draws a virtual border for the sub-image. If prompted sub-image determination is selected, the native remote computing device 114 and/or other computing device prompts the user to select a series of landmarks on the displayed image (e.g., corner of the mouth, then corner of the nose, then corner of the eye, etc.). Subsequently, the native remote computing device 114 and/or other computing device may draw in the sub-image border by connecting the landmarks.

If automatic sub-image determination is selected, a decision is made to use fully automatic or semi-automatic sub-image determination. If semi-automatic sub-image determination is selected, the user may select several landmarks, but not all of the landmarks, for the sub-image. The native remote computing device 114 then may determine the remaining landmarks automatically by comparing the user entered landmarks to a predetermined landmark template (e.g., a standard mask) and interpolating the user entered landmarks using shape warping algorithms.

Similarly, as an example, the remaining landmarks may be calculated by taking the spatial difference vector (delta x, delta y) between the user entered landmarks and a standard mask for each of the user entered landmarks. Then, the remaining landmarks may be calculated using a bilinear interpolation of the spatial difference vectors and the x, y coordinates of the two closet user entered landmarks. Subsequently, the native remote computing device 114 may draw in the sub-image border by connecting the landmarks (both user entered landmarks and automatically determined landmarks).

If fully automatic sub-image determination is selected, the native remote computing device 114 and/or other computing device determines all of the landmarks for the sub-image automatically by searching for patterns in the digital image indicative of predetermined landmarks. Once the main sub-image is determined, additional sub-images may be determined. In one embodiment, an arc is drawn by the native remote computing device 114 between two of the landmarks to define an "under eye" sub-image border. The user may then adjust the size of the "under eye" sub-image. In some embodiments, a sub-image is electronically determined by comparing a plurality of color values of a plurality of pixels to a predetermined threshold indicative of skin color.

Once the sub-images are determined, the sub-images may be analyzed to locate defect areas and compare the severity of the defect areas to an average skin severity of a population of people. In one embodiment, defect areas are areas in the sub-image which meet certain criteria (e.g., a red spot). The severity of a particular instance of a defect is an estimation of the degree to which humans perceive one defect as being "worse" than another. For example, a large red spot is considered more severe than a small red spot. Many different defect types may be located. For example, skin elasticity features such as wrinkles and/or fine lines may be located. Skin smoothness, skin texture, follicular pores, inflamed red spots such as acne, hyperpigmented spots such as senile lentigenes, nevi, freckles, as well as many other skin defects may also be located using a variety of known algorithms.

Additionally, an index variable may be initialized to zero. The index variable may be utilized to keep track of which type of skin defect is being analyzed. If only one defect type is being analyzed, the index variable may be eliminated. A plurality of areas in the sub-image may contain the current defect type are located. For example, if the sub-image contains six red spots (as defined by a known red spot detection algorithm) then six locations in the sub-image are determined. Each location may be identified using a single set of geometric coordinates specifying the approximate center of the located defect, or, each location may be identified by a set of geographic coordinates covering a region affected by the current defect type.

Figure 11:
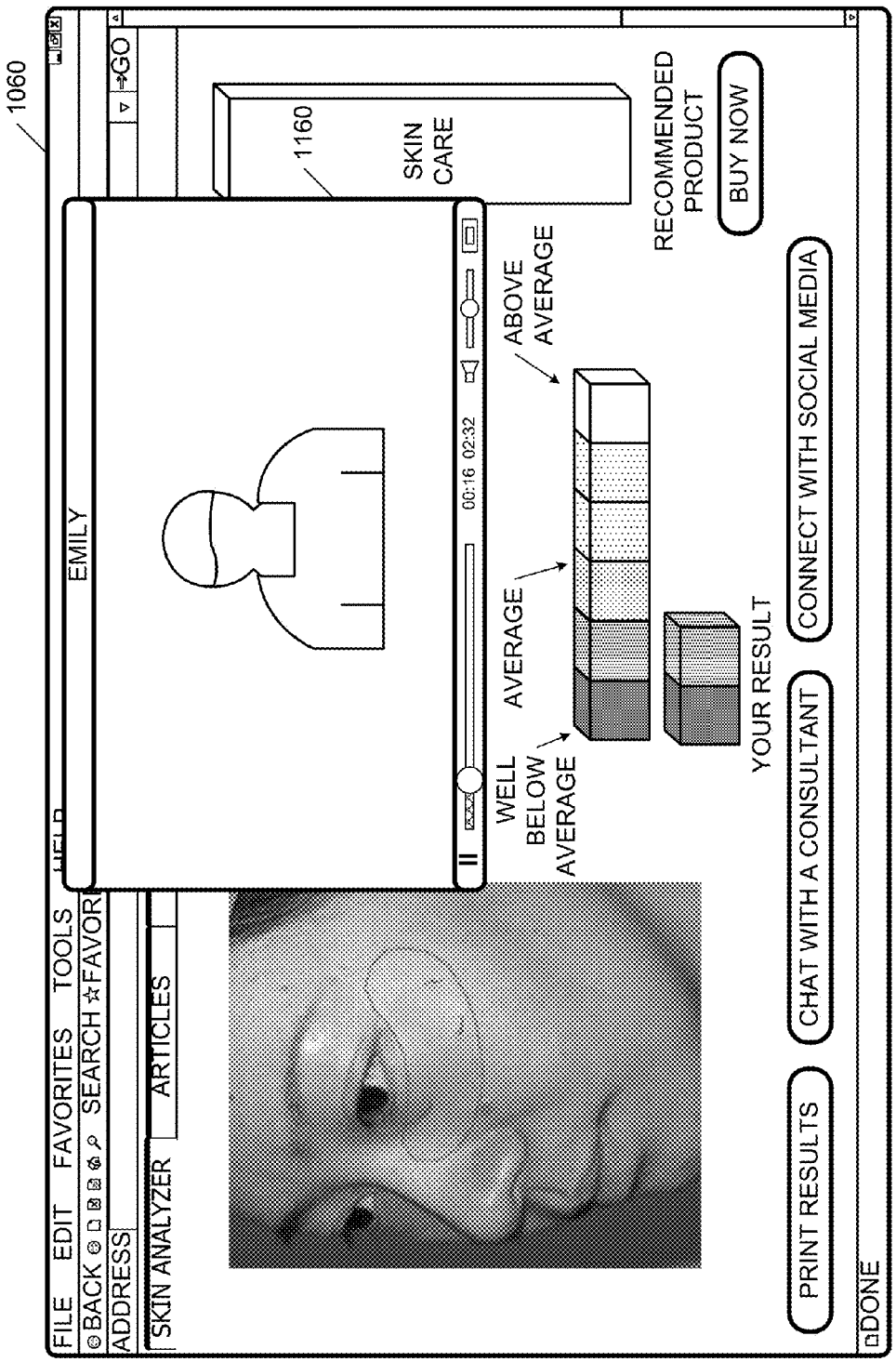
FIG. 11 depicts a user interface for providing a communication portal with a consultant, according to some embodiments disclosed herein.

FIG. 11 depicts a user interface 1160 for providing a communication portal with a consultant, according to some embodiments disclosed herein. More specifically, in response to selection of the chat with an consultant options 976, 1076 in FIGS. 9 and 10, respectively, the user interface 1160 may be provided. From the user interface 1160, the user may conduct a video conference to discuss one or more aspects of the consultation.

It should be understood that while in some embodiments, the user interface 1160 is provided in response to selection of the chat with a consultant options 976, 1076, this is merely an example. More specifically, if the consultation is a personal consultation, selection of these options may call the consultant to physically walk over to the user to provide the assistance.

Figure 12:
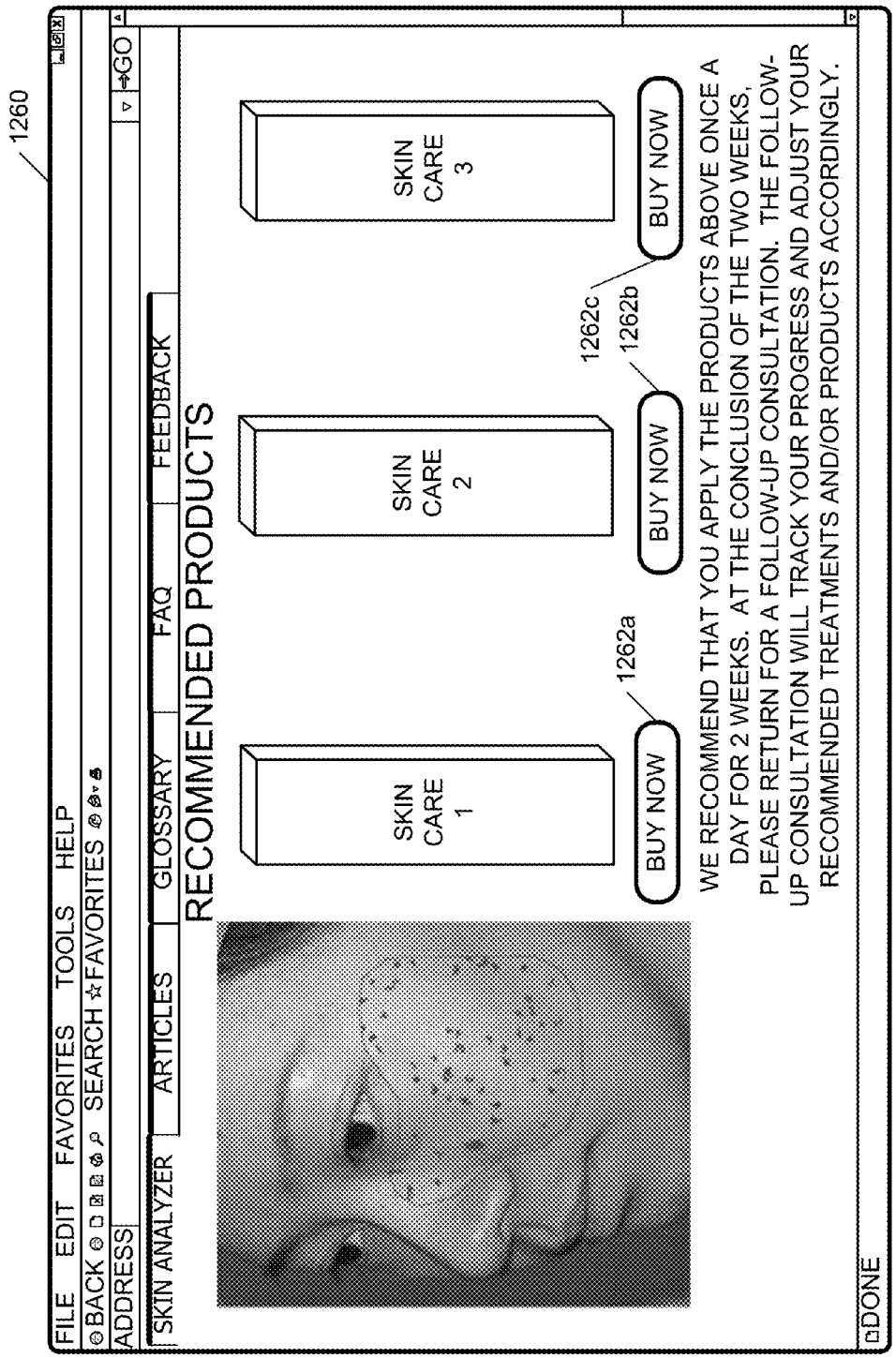
FIG. 12 depicts a user interface for providing treatment and/or product recommendations to a user, according to some embodiments disclosed herein.

FIG. 12 depicts a user interface 1260 for providing treatment and/or product recommendations to a user, according to some embodiments disclosed herein. As illustrated, once the image analysis is complete on the user image, the service can review the information, provide product recommendations, provide treatment recommendations, and/or provide other services. More specifically, the recommended products may be provided in the user interface 1260, with purchase options 1262a, 1262b, and 1262c. Additionally provided in the user interface 1260 is a treatment recommendation for the subject.

Additionally, a simulated image showing an improvement and/or worsening to the defect areas may be provided. Simulating worsening may be useful when the consultant is recommending a treatment using a product which prevents skin degradation to show the user the potential affects if he/she fails to take precautionary measures. Simulating improvements may be useful when the consultant is recommending a treatment using a product that eliminates and/or hides skin defects to show the analyzed person the potential benefits of the products.

Similarly, in some embodiments, a text chat and/or other communications may be provided for allowing the user to interact with the consultant. In some embodiments, a video recording option may be provided to allow the user to save the consultation for later use.

Example Back-End Processing Windows

FIGS. 13A-13D depict a plurality of images that illustrates color correction, according to some embodiments disclosed herein. Referring initially to window 1342 in FIG. 13A, image processing may begin with receiving an uploaded image and converting the image from RGB format to LAB format. In window 1344 and 1346, the B channel of the LAB converted image may then be filtered. By filtering the B channel between a threshold (e.g., 65-110), the blue coloring of the calibration device 110 may be shown as white (binary 1) and the non-blue portions of the image may be shown as black (binary 0). From this data, in FIG. 1348, the calibration device 110 in the RGB image may be located. Additionally, because the calibration device 110 may include the alignment indicator 252, two separate portions of the calibration device 110 may be identified. Because of this, a measurement of the respective lengths of the portions may be performed. The portion of the greatest length is the portion of the calibration device of interest.

In the window 1350, the resolution indicator 254 may then be identified. The resolution indicator 254 may be identified by finding pixels in the LAB converted image that potentially could be the resolution indicator. From this another filtering may be performed to filter out the resolution indicator 254. Additionally in window 1350, a central point of the resolution indicator 254 may be identified by determining the coordinates of the pixels in the resolution indicator and determining the mean coordinate point. Additionally, to determine which arm of the resolution vector is the substantially vertical arm and which is the substantially horizontal arm, in window 1352 Eigen-Vectors may be determined from the central point to each pixel in the resolution indicator 254. As the horizontal arm is longer, the direction with the largest Eigen-Vector may be identified as the horizontal arm. In window 1354 a boundary for separation of the resolution device 254 may be determined. In window 1356, the resolution indicator 254 may be highlighted in the RGB image.

Figure 13A:
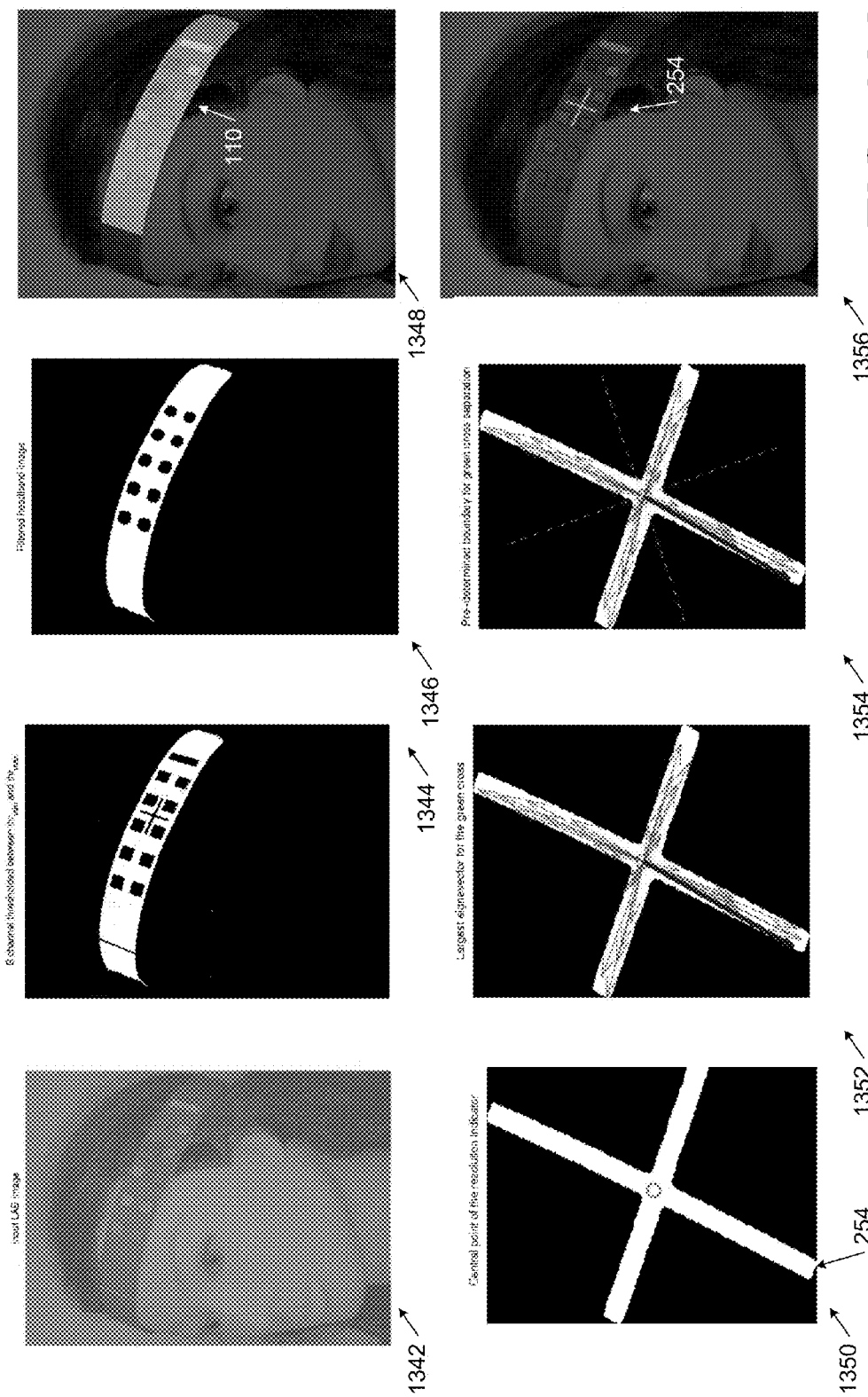
FIGS. 13A-13D depict a plurality of images that illustrates color correction, according to some embodiments disclosed herein.
Figure 13B:
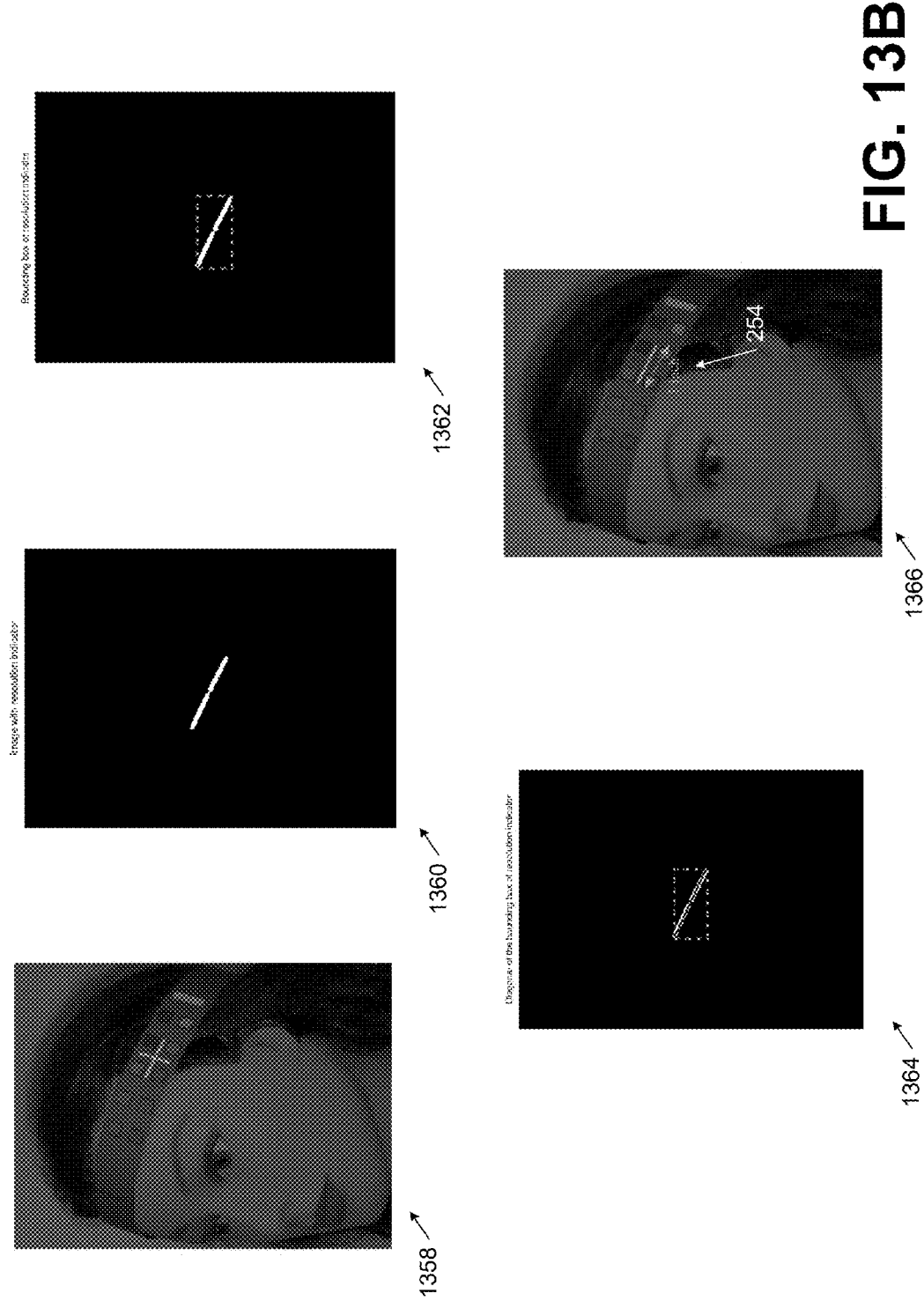
Figure 13C:
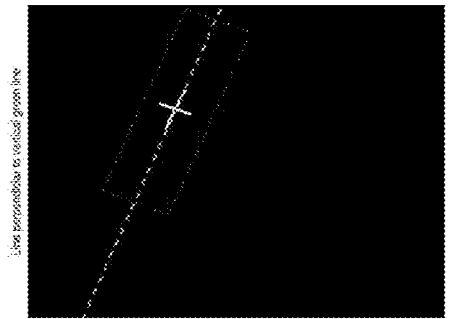
Figure 13C:
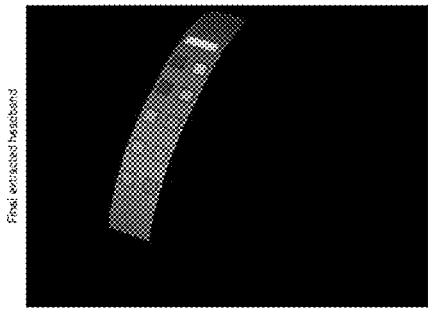
Figure 13C:
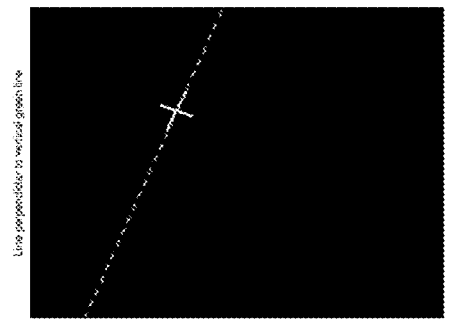
Figure 13C:
Figure 13D:
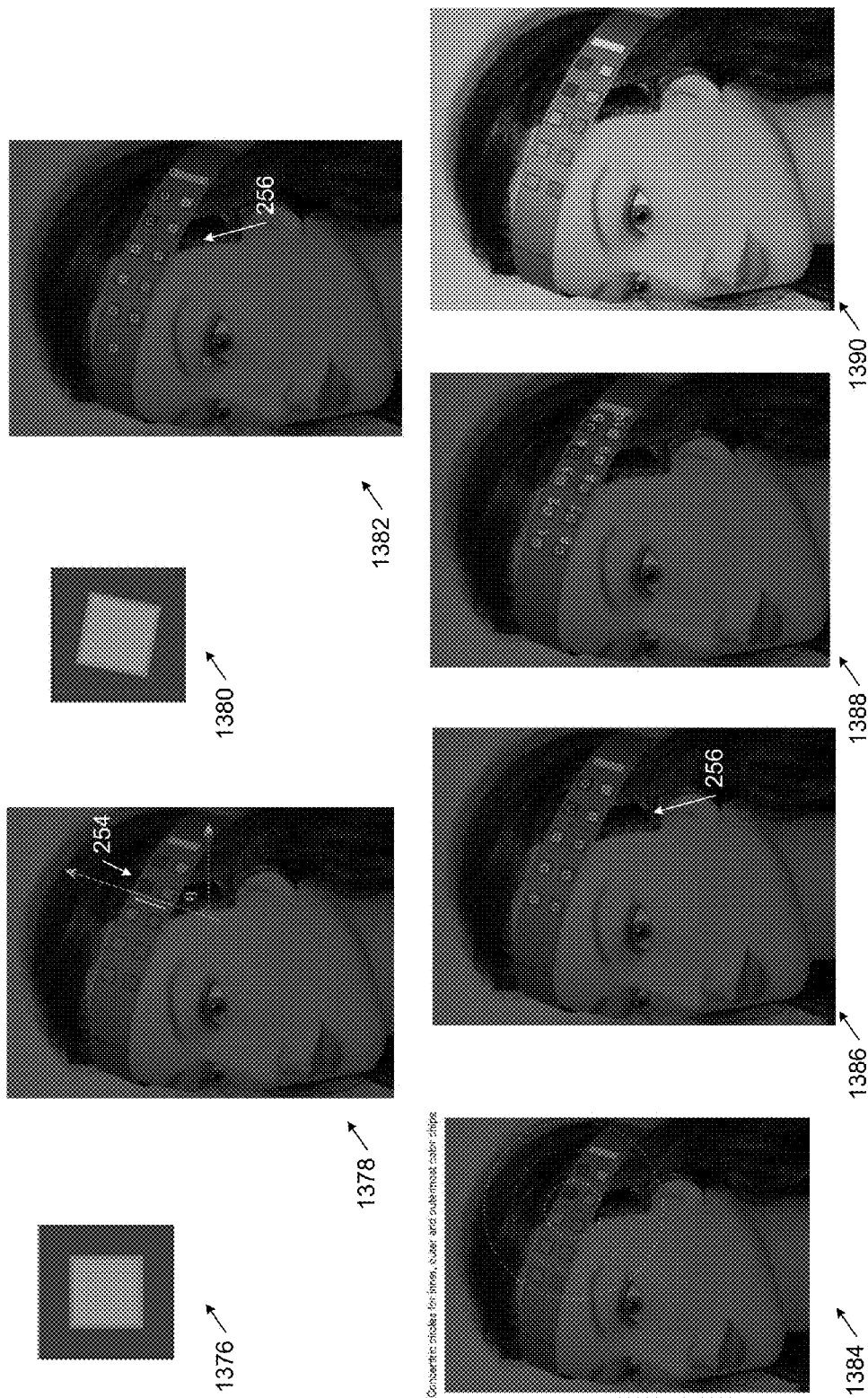

Referring now to window 1358 in FIG. 13B, the RGB image may be retrieved and the previously determined horizontal arm may be separated from the vertical arm of the resolution indicator 254. In window 1362 a bounding box may then be constructed around the horizontal arm of the resolution indicator 254. The distance (in pixels) of the diagonal of the bounding box may then be divided by the known actual length resolution indicator 254 to determine the resolution of the image, as illustrated in window 1366.

Once the resolution indicator has been determined, as discussed above, the calibration device 110 may be identified uniquely. More specifically, as there may be other objects in the uploaded image that are the same (or similar) color as the calibration device 110, windows 1368-1374 illustrate actions that may be used to remove those extraneous objects. Referring now to window 1368 in FIG. 13C, a line that is perpendicular to the vertical arm of the resolution indicator 254 may be determined. From this line, a box may be created that spans a predetermined length in opposing directions from the perpendicular line. As an example, if the known width of the calibration device 110 is 3 inches, the box may be created 1.5 inches on either side of the perpendicular line. Similarly, the box may span a length that begins from the vertical line and extends ½ the known length of the calibration device in opposing directions. From this box, the calibration device may be identified as being within the boundaries of the box, as shown in window 1374. In window 1374, the RGB image may then be applied to uniquely identify the calibration device 110.

As noted above, the calibration device 110 may include a plurality of color chips. The plurality of color chips may be mapped from the image to determine which values to retrieve from the database for comparison. Based on the observed values and the expected values, a color correction may be determined. Referring now to window 1376 in FIG. 13D, a template of a color chip may be created. In window 1378, an angle of the calibration device 254 in the uploaded image may be determined from the previously determined vertical arm. In window 1380, the template may be rotated the determined angle. In window 1382, the template may be applied to the uploaded image to determine possible color chips in the uploaded image. In window 1384, concentric circles may be created to determine approximate locations of the actual color chips from the resolution indicator 254. In window 1386, a determination of the color chips may be identified. In window 1388 the color chips may be numbered. In window 1390, based on the numbered color chips and the known color of each of the color chips, the image may be color corrected.

Figure 14:
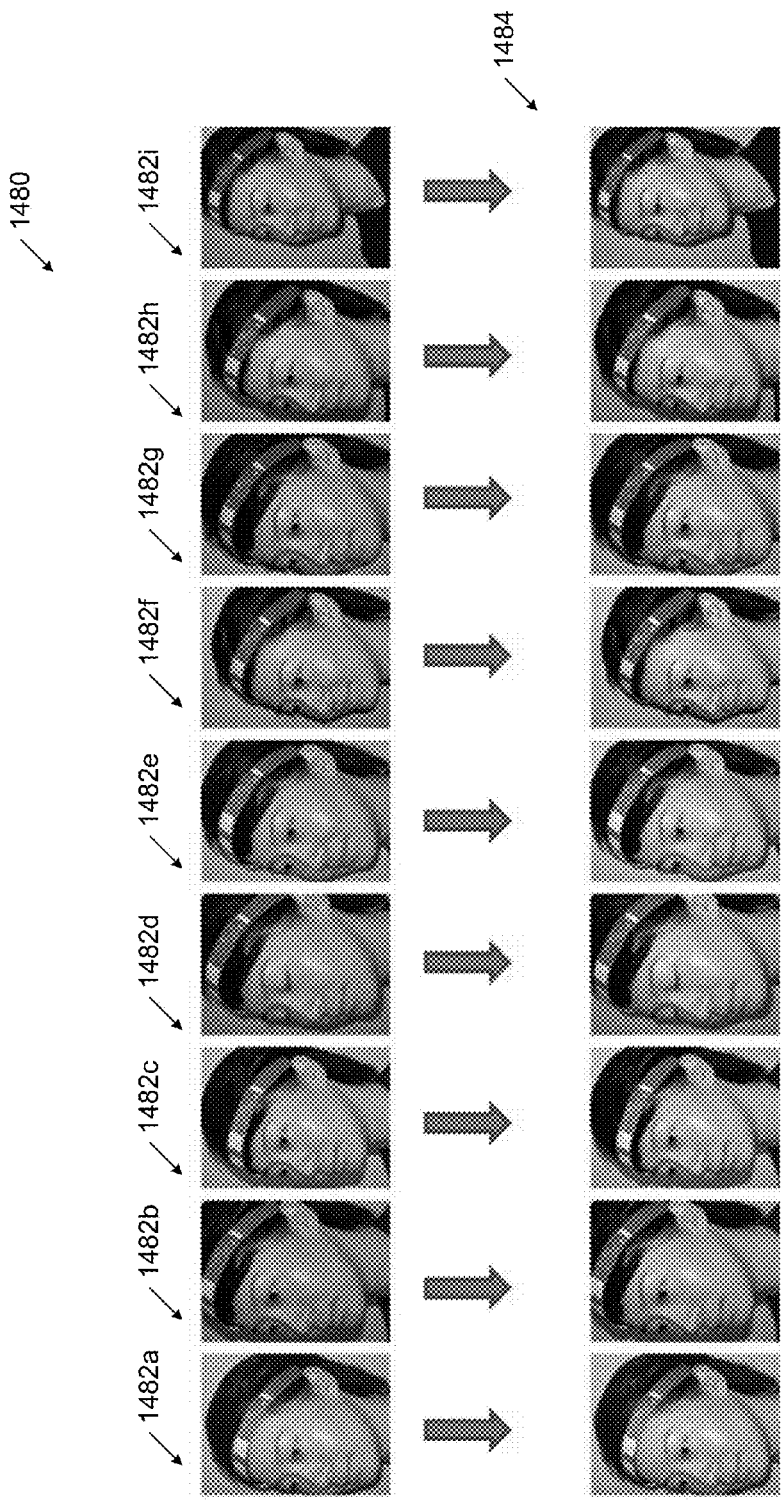
FIG. 14 depicts a plurality of images that illustrates final results from color correction.

FIG. 14 depicts a plurality of images 1480 that illustrates final results from color correction. As illustrated, each of the images may be altered according to the process described herein to provide an adjusted image with standard image characteristics. More specifically, the images 1482 were captured by a plurality of different image capture devices 104a, 104b. As an example, image 1482a was captured with the Canon Powershot A510; the image 1482b was captured with the Canon Powershot S2 IS; the image 1482c was captured with the Canon Powershot S3 IS; the image 1482d was captured with the Canon Powershot S70; the image 1482e was captured with the Canon Powershot SD550; the image 1482f was captured with the KODAK EASYSHARE C743; the image 1482g was captured with the KODAK CX6445; the image 1482h was captured with the KODAK DX7590; and the image 1482i was captured with the KODAK V705. As the images 1482 were taken with different cameras, each of the images 1482 may have different color characteristics. However, through the color correction process described above, the images 1484 are consistent. Additionally, once the color correction has been performed, other alterations to the images may be made, as described below.

As an example, the uploaded digital image may be compared to a mannequin image to provide feature detection and spatial image adjustment. As such, the mannequin image may be utilized to determine relative head position, relative head tilt, relative head pitch, and/or relative head yaw. The uploaded image may then be altered to substantially match the mannequin image according to at least one image characteristic, such as size, orientation, position, etc., as described below with regard to FIGS. 15A and 15B.

Figure 15B:

FIGS. 15A and 15B depict a plurality of images that illustrates feature detection and spatial image adjustment, according to some embodiments disclosed herein. As illustrated, the color corrected image in window 1580 may be accessed for detecting at least one feature of the image. From the color corrected image, a two-tone facial mask image in window 1582 may be created to determine various features on the target substrate. The features may include a corner of the nostril, a corner of the eye, a corner of the mouth, and/or other features on the subject. In window 1584, a first feature (e.g., the corner of the nostril) may be determined. This feature may be compared with a mannequin image (not illustrated) that has a corresponding first feature with a known location.

Based on the known location of the first feature on the mannequin image, a search for a second feature on the uploaded image may be determined (e.g., a corner of the eye). The second feature may be located within a constrained search area, which may be within a predetermined distance from the first feature, as determined from the mannequin image. If the second feature does not match the second feature on the mannequin image, the uploaded image (and/or the corresponding coordinate system) may be altered (e.g., rotated, cropped, etc.) to allow the features to align. Similarly, in the window 1588, a third feature (e.g., a corner of the mouth) may be determined as also being a predetermined distance from the first feature and/or the second feature, based on a corresponding third feature of the mannequin image. In the window 1590, the image may be cropped and/or rotated to match the characteristics of the mannequin image. The altered image may then be provided in window 1592.

It will be understood that by comparing the uploaded image to a mannequin image, the landmarks and features of the uploaded image may be normalized. More specifically, because many uploaded images are compared with a standard mannequin image, the alterations to the uploaded images will be consistent, thus providing a standard result by which to perform spot and wrinkle analysis.

FIG. 15B depicts a plurality of color corrected images 1594, as described above. Also included is a plurality of rotated images 1596, which have been compared with a mannequin image and rotated, based on the determined features. A plurality of cropped images 1598 is also included, which provides the resulting image for spot and/or wrinkle analysis, as described herein.

Example Front End Processes

Figure 16:
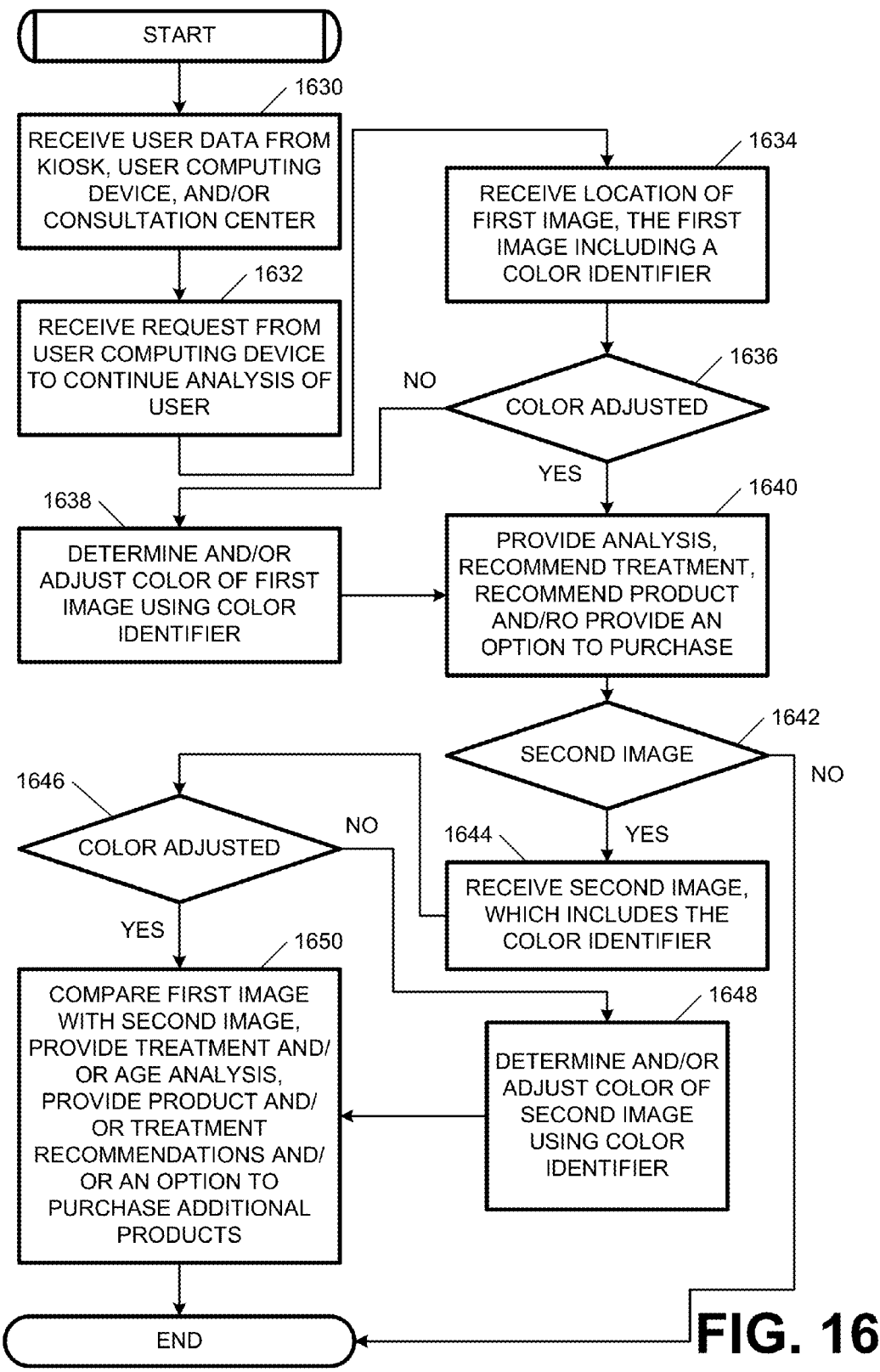
FIG. 16 depicts a flowchart for providing a virtual consultation, according to some embodiments disclosed herein.

FIG. 16 is a flowchart for providing one type of consultation. As illustrated in block 1630, user data may be received from a kiosk 102, user computing device 118, and/or consultation center 112. At some point during (or after) the consultation, the user may wish to view and/or continue the consultation at another location. As such, data from the consultation may be sent to the native remote computing device 114 and/or foreign remote computing device 116. In block 1632, a request may be received from a user computing device 118 (or kiosk 102) to continue the consultation. In block 1634, the location of a first image may be retrieved, where the first image includes a calibration device 110.

In some embodiments, the first image may be stored on a foreign remote computing device 116, such as on a social network. The native remote computing device 114 may retrieve the image and determine that the image includes the calibration device 110. In block 1636, a determination may be made regarding whether the color of the image has been adjusted, utilizing the calibration device 110. If not, at block 1638 the color of the first image may be determined and/or adjusted by utilizing the calibration device 110. If the color has already been adjusted, in block 1640 an analysis may be provided, a treatment may be recommended, a product may be recommended, and/or an option to purchase a product may be provided.

In block 1642 a determination may be made regarding whether there is a second image to utilize for the consultation. More specifically, oftentimes, the first image may cause the consultation to recommend a product and/or treatment. The user may then wish to return for an additional consultation after utilizing the recommended product and/or treatment. As such, the user may capture a second image so that the service can analyze the improvement that the treatment and/or product caused. Similarly, in some embodiments the user may desire to compare (or share with friends) images taken before, during, or after treatment with a cosmetic product in order to make self comparison of potential changes during the treatment period. If there is no second image, the process may end. If however, there is a second image, at block 1644 the second image may be retrieved, where the second image includes a calibration device 110.

In block 1646, a determination may be made regarding whether the color of the second image has been adjusted. If not, in block 1648, the color of the second image may be determined and/or adjusted utilizing the calibration device 110. In block 1650, the first image may be compared with the second image. From this comparison, an additional analysis may be performed, such as a treatment analysis. Additionally, a further product recommendation and/or treatment recommendation may be provided. An option to buy the recommended product and/or additional products may also be provided. As an example, the recommended products may include color cosmetic products, skin care products, hair care products, medical products, dental products, grooming products, beauty and grooming devices, and/or other products.

It should be understood that by saving the imagery and/or other data on a social network or other foreign remote computing device, options may be provided for soliciting comments, feedback, ratings, and/or other information from the social network community. Similarly, promotions, contents, and/or other events may be provided, which utilizes this data.

Figure 17:
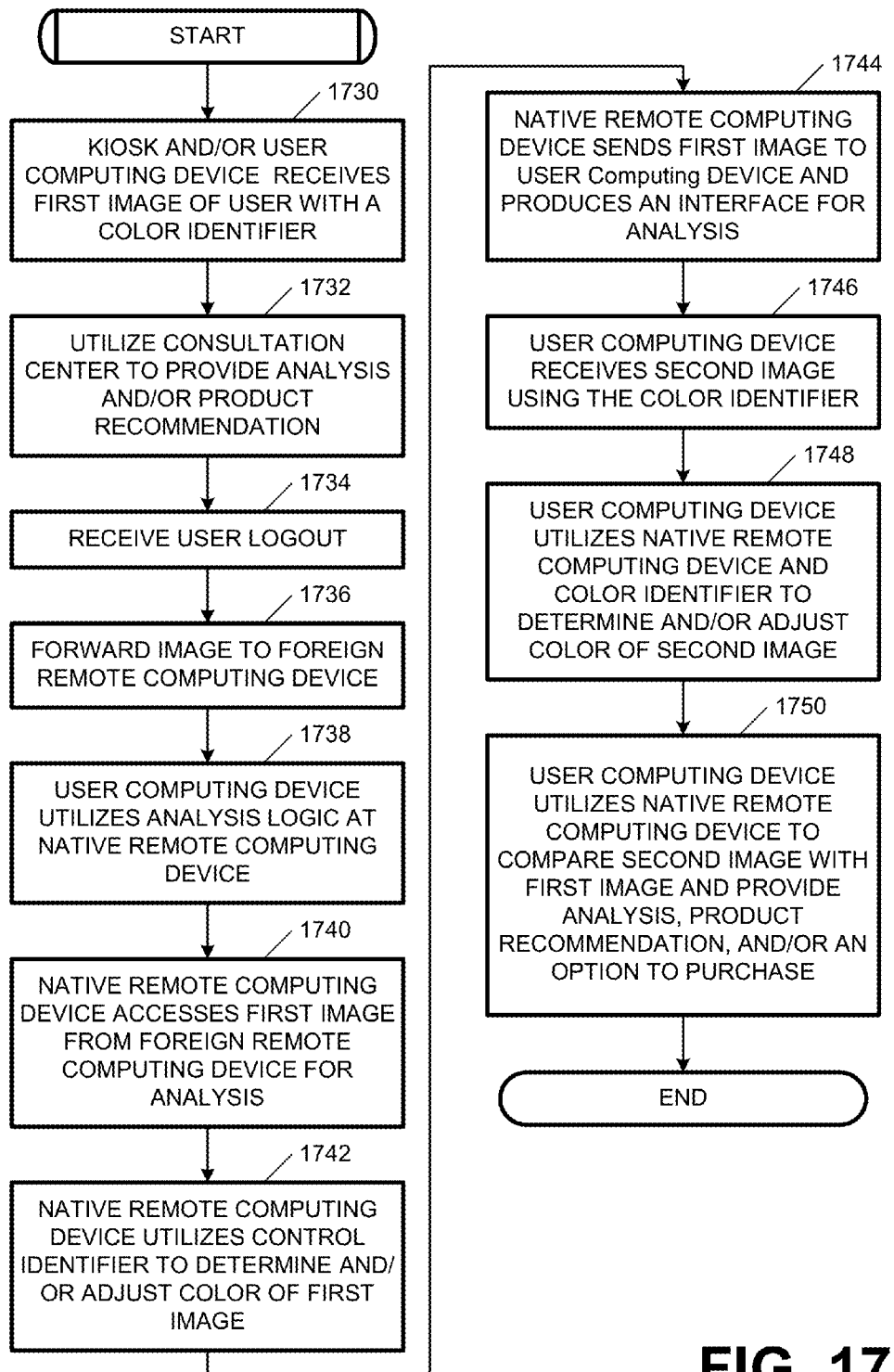
FIG. 17 depicts another flowchart for providing a virtual consultation, according to some embodiments disclosed herein.

FIG. 17 depicts another flowchart for providing a virtual consultation, according to embodiments disclosed herein. As illustrated in block 1730, a kiosk 102 and/or user computing device may receive a first image of a user with a calibration device 110. In block 1732, the kiosk 102 and/or user computing device 118 may utilize a consultation center 112 to provide analysis and/or product recommendations. In block 1734, the kiosk 102 and/or user computing device 118 may receive the user logout. In block 1736, the kiosk 102 and/or user computing device 118 may forward a first image to the foreign remote computing device 116. In block 1738, the user computing device 118 may utilize analysis logic 144b at the native remote computing device 114 to facilitate a consultation. As discussed above, from the user computing device 118, the consultation may be a personal consultation, a semi-personal consultation, and/or a virtual consultation. As such, the user computing device 118 may provide one or more interfaces for facilitating the consultation.

In block 1740, the native remote computing device 114 may access the first image from the foreign remote computing device 116 for analysis. In block 1742, the native remote computing device 114 may utilize the calibration device 110 to determine and/or adjust the color of the first image. In block 1744, the native remote computing device 114 may send the first image to the user computing device 118 and may produce an interface for providing the consultation. In block 1746, the user computing device 118 receives a second image that includes a calibration device 110. In block 1748, the user computing device 118 utilizes the native remote computing device 114 and the calibration device 110 to determine and/or adjust the color of the second image. In block 1750, the user computing device 118 may utilize the native remote computing device 114 to compare the second image with the first image and provide an analysis, a product recommendation, a treatment recommendation, and/or an option to purchase a product. In some embodiments, the first and second images may merely be displayed on the user computing device 118 for visual inspection by the user.

Figure 18:
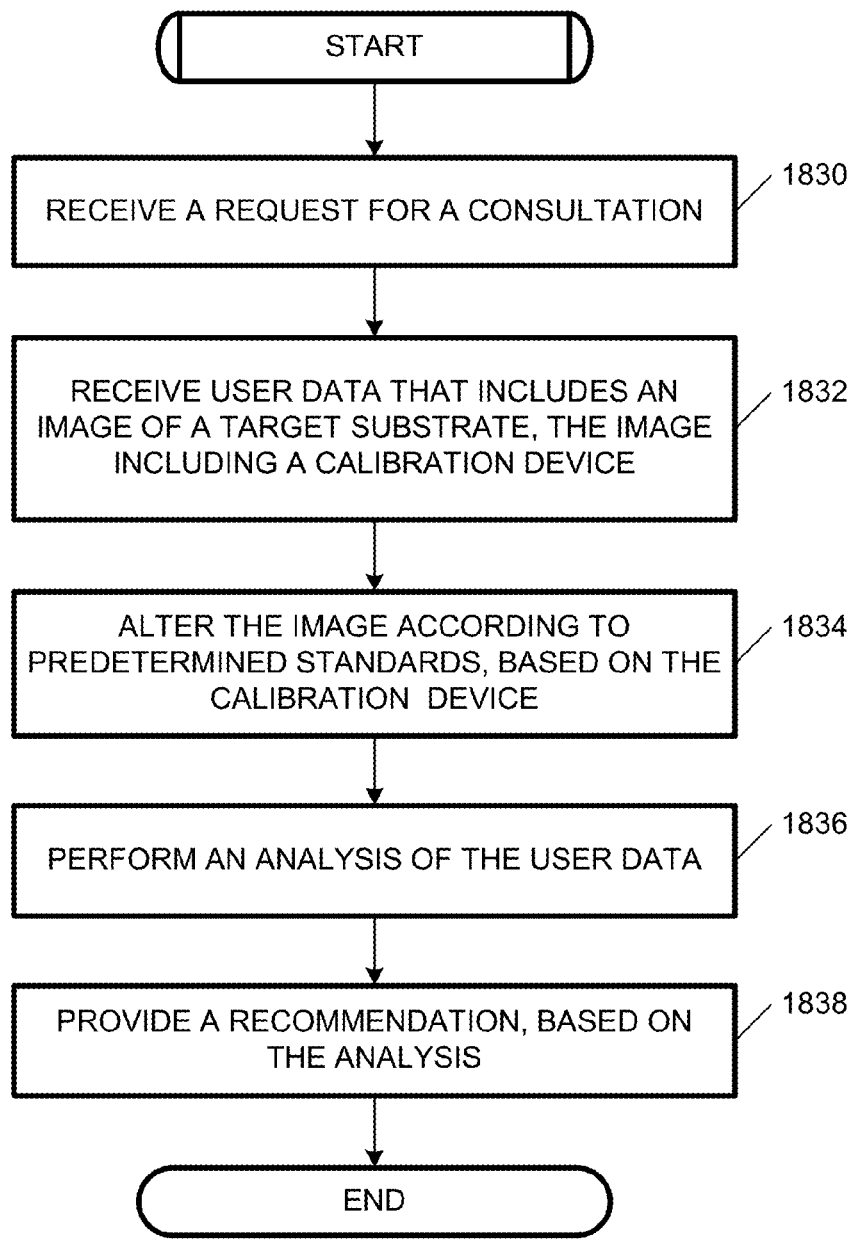
FIG. 18 depicts a flowchart for providing a recommendation to a user, according to some embodiments disclosed herein.

FIG. 18 depicts a flowchart for providing a recommendation to a user, according to embodiments disclosed herein. As illustrated in block 1830, a request for a consultation may be received. In block 1832, user data may be received, where the user data includes an image of a target substrate. The image may include a calibration device 110. In block 1834, the image may be altered according to predetermined standards, based on the calibration device 110. In block 1836, an analysis may be performed of the user data. In block 1838, a recommendation may be provided, based on the analysis.

Figure 19:
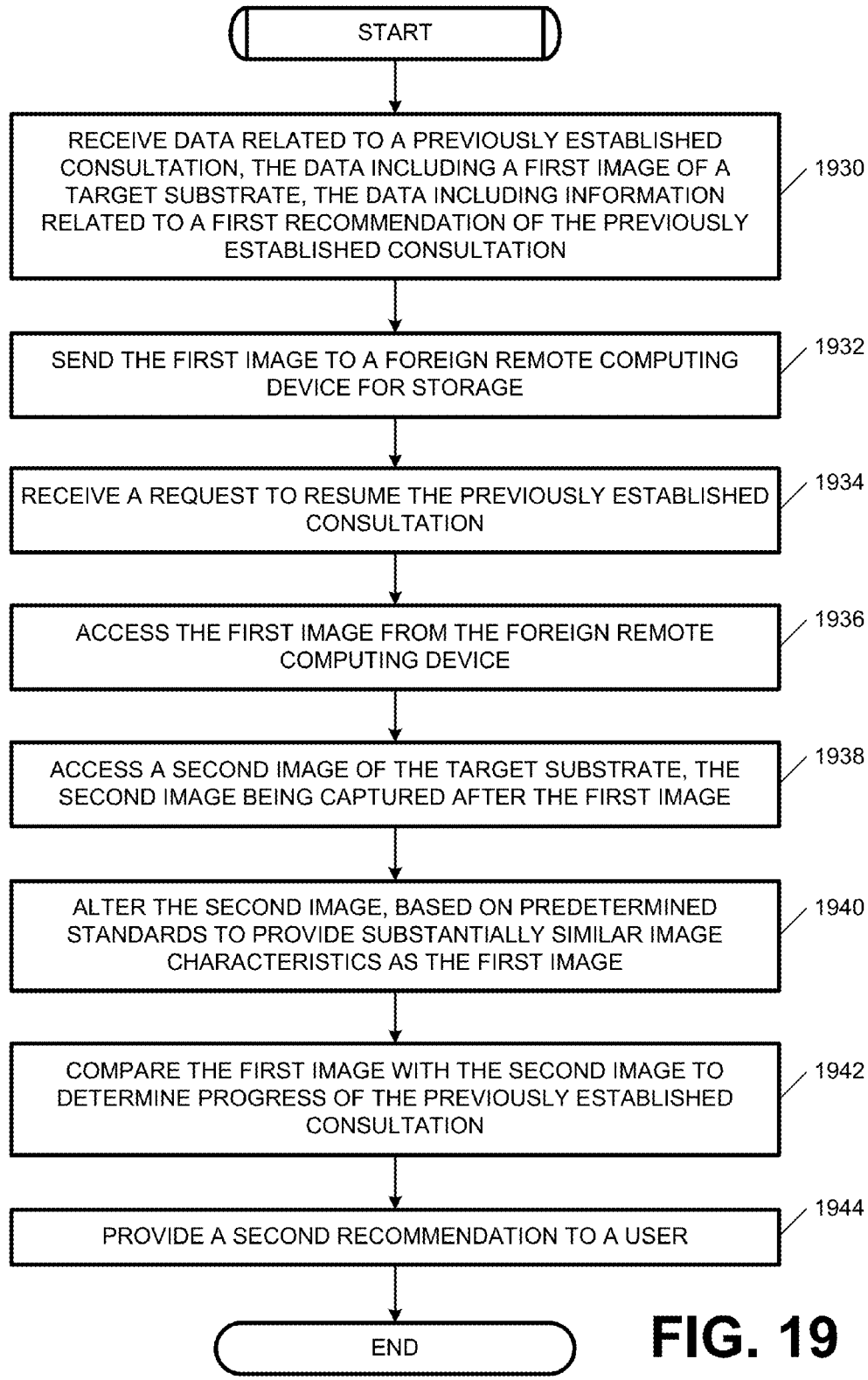
FIG. 19 depicts another flowchart for providing a recommendation to a user, according to some embodiments disclosed herein.

FIG. 19 depicts another flowchart for providing a recommendation to a user, according to embodiments disclosed herein. As illustrated in block 1930, data related to a previously established consultation may be received. The data may include a first image of a target substrate. The data may also include information related to a first recommendation of the previously established consultation. In block 1932, the first image may be sent to a foreign remote computing device 116 for storage. In block 1934, a request to resume the previously established consultation may be received. In block 1936, the first image from the foreign remote computing device 116 may be accessed. In block 1938, a second image of the target substrate may be accessed, the second image being captured after the first image. In block 1940, the second image may be altered, based on predetermined standards to provide substantially similar image characteristics as the first image. In block 1942, the first image may be compared with the second image to determine progress of the previously established consultation. In block 1944, a second recommendation may be provided to a user.

Figure 20:
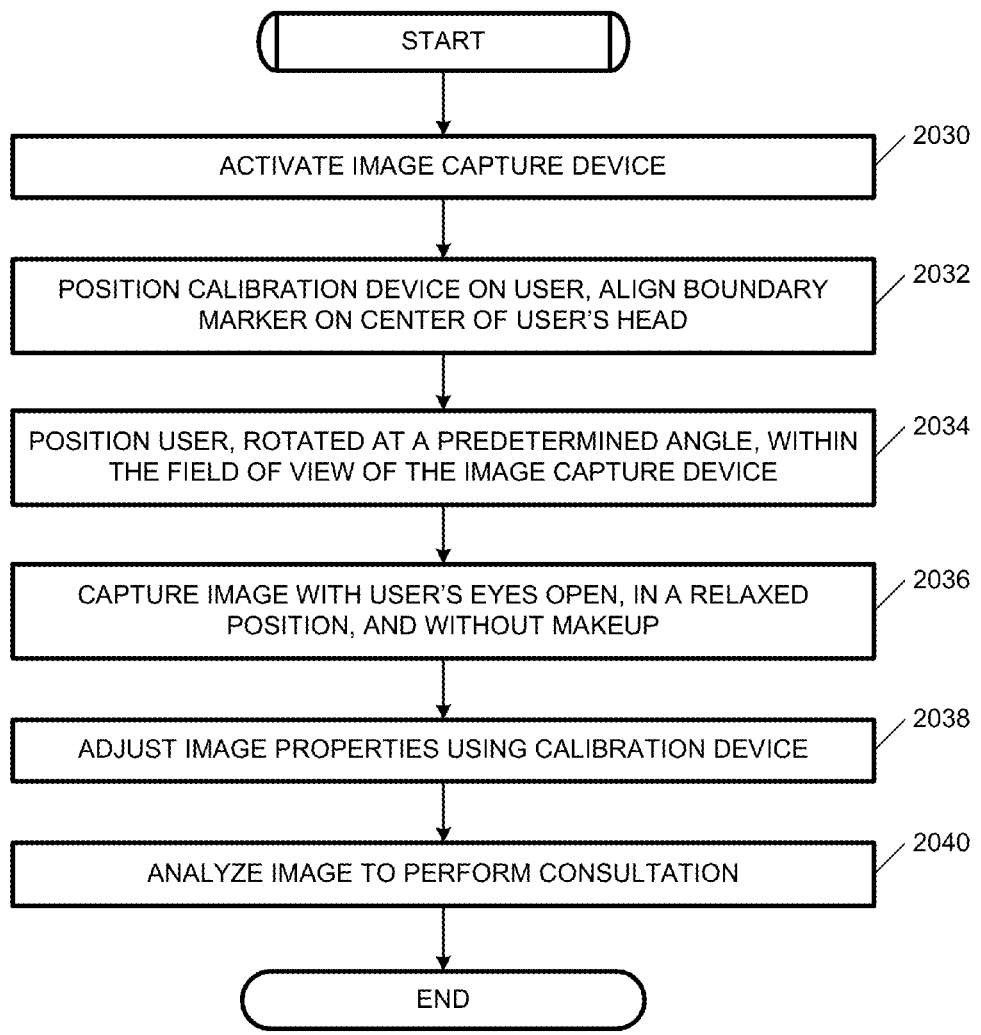
FIG. 20 depicts a flowchart for capturing an image of a user and a standard calibration device, according to some embodiments disclosed herein.

FIG. 20 depicts a flowchart for capturing an image of a user and a calibration device 110, according to some embodiments disclosed herein. As illustrated in block 2030, an image capture device may be activated. In block 2032, a calibration device 110 may be positioned on the user, where the boundary marker is centered on the user's head. In block 2034, the user may be positioned within the field of view of the image capture device 104a, 104b and rotated at a predetermined angle to provide visual access to the target substrate. In block 2036, an image may be captured with user's eyes open, in a relaxed position, and optionally with or without wearing makeup. The image may be transmitted via the network 100 to the consultation center 112 and/or the native remote computing device 114. In block 2038, image properties may be adjusted, using calibration device as a guide. In block 2040, the image may be analyzed and/or altered to facilitate the consultation. For example, the image may be color corrected and/or facial features (e.g., fine lines, wrinkles, age spots, crow's feet) may be identified therein by one or more indicators 964, 1064 (see, e.g., FIGS. 9 and 10), such as a box, circle, line, arrow, or other geometric shape or symbol. The altered image of the user containing the indicators may be transmitted from the consultation center 112 and/or the native remote computing device 114 to the kiosk 102 or a user computing device 118 via the network 100 and displayed on a display device thereof.

Example Back-End Processes

Figure 21:
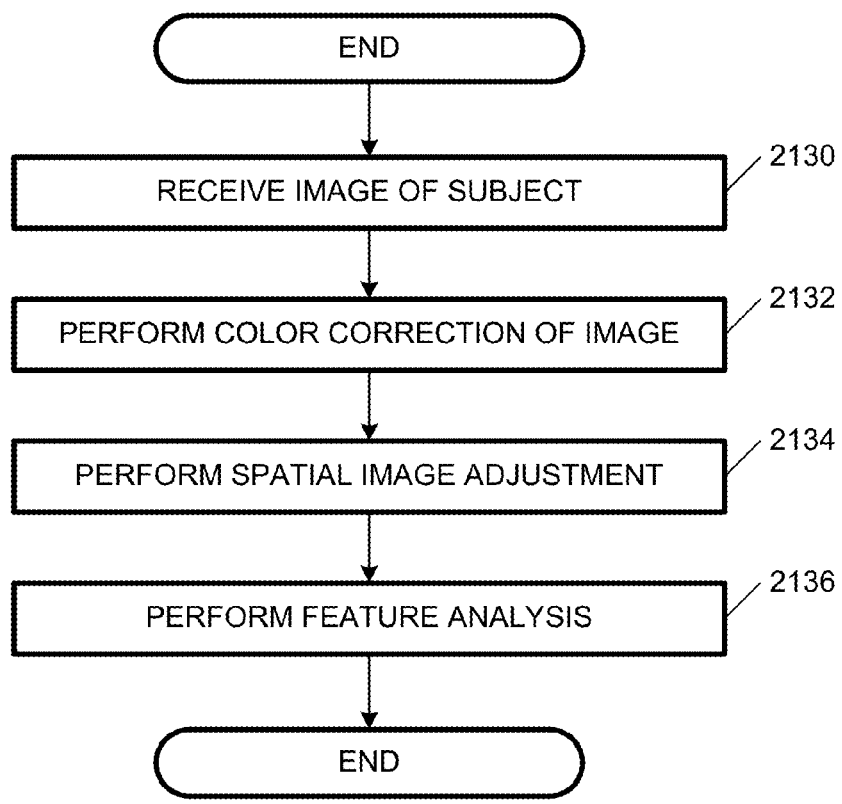
FIG. 21 depicts a flowchart for altering an image for analysis, according to some embodiments disclosed herein.

FIG. 21 depicts a flowchart for altering an image for analysis, according to some embodiments disclosed herein. Similar to the discussion from FIG. 14 above, in block 2130, an image of the subject may be received. As discussed above, the image may be received from an image capture device 104a, 104b, from a foreign remote computing device 116 (such as a social network), from the user computing device 118, and/or from another source. In block 2132, a color correction of the image may be performed. In block 2134 a spatial image adjustment may be performed.

More specifically, as described above, the uploaded digital image may be compared to a mannequin image. The mannequin image may have a predetermined relative head position, relative head tilt, and/or relative head yaw. The uploaded digital image may then be compared with the mannequin image. If the uploaded digital image does not match the mannequin image, the uploaded digital image may be altered to substantially match the mannequin image according to at least one image characteristic, such as size, orientation, position, etc. In some embodiments, altering the uploaded digital image includes matching a predetermined point on the portion of the face of the subject with a corresponding point on the portion of the face of the mannequin. In block 2136, the image may be compared to a mask to further adjust the characteristics of the uploaded image. In block 2138, feature analysis may be performed.

Figure 22:
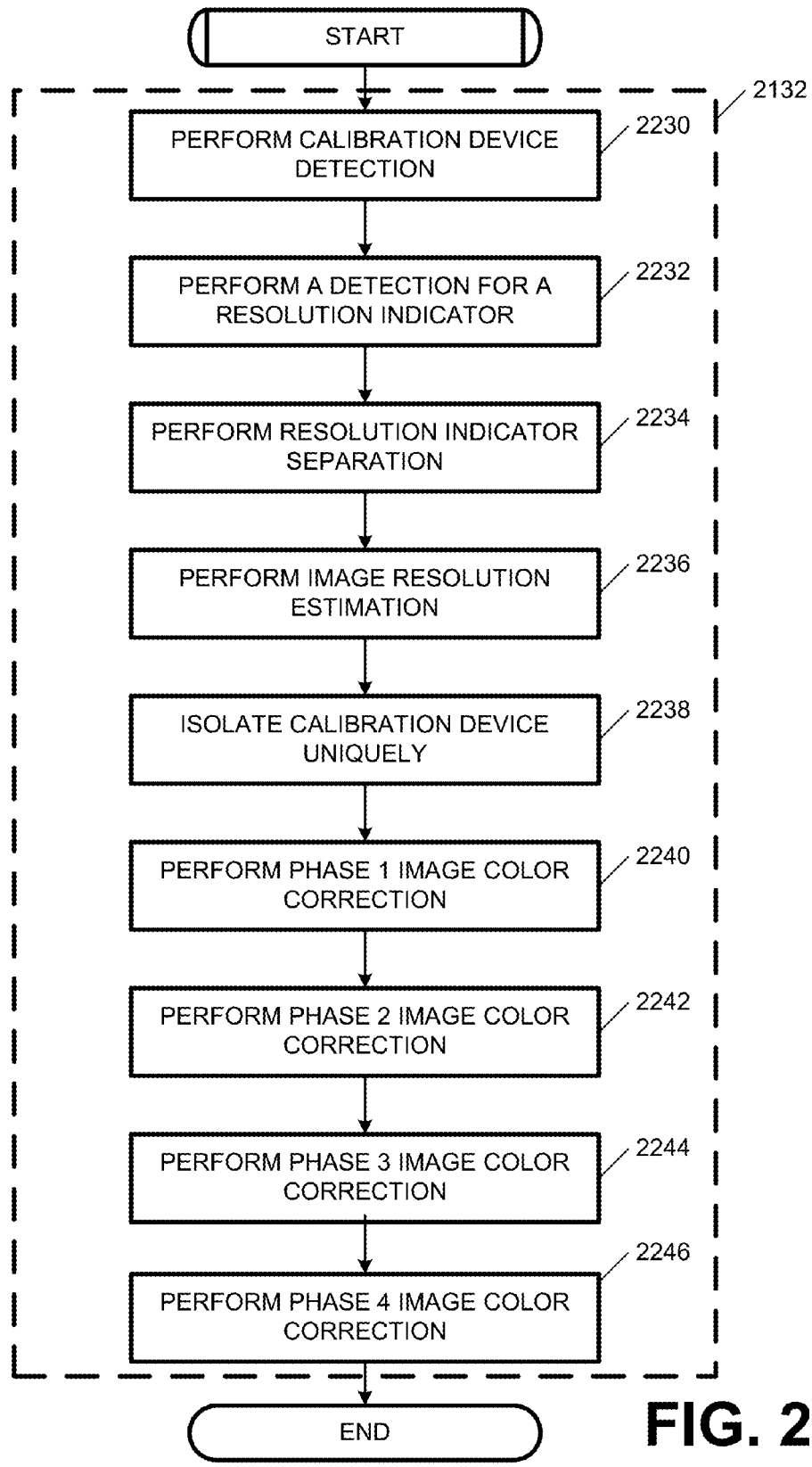
FIG. 22 depicts a flowchart for performing color correction, according to some embodiments disclosed herein.

FIG. 22 depicts a flowchart for performing color correction, according to some embodiments disclosed herein. As illustrated, from FIG. 21, the block 2132 may include a plurality of actions. More specifically, in block 2230 a calibration device detection may be performed. In block 2232, the resolution indicator 254 may be detected. In block 2234 the resolution indicator may be separated into a horizontal arm and a vertical arm. In block 2236, image resolution may be estimated from the resolution indicator. More specifically, the horizontal arm of the resolution indicator 254 may have a predetermined length. Based on the number of pixels that the resolution indicator 254 spans in the image the resolution of the image may be determined.

Additionally, determinations may be made regarding whether the uploaded image meets resolution thresholds. More specifically, in some embodiments the image should be at least about 220 pixels per inch (and in some embodiments between about 150 to about 500 pixels per inch), which would be a predetermined first resolution threshold. This threshold has been determined as being adequate for performing wrinkle and/or spot analysis. If the uploaded image meets that requirement, the image may be processed as described herein. If not, a determination may be made regarding whether the uploaded image is of a predetermined second resolution threshold that is available for up-conversion. If not, the image may be rejected. If so, the image may be up-converted to meet the 220 per inch threshold.

Returning to FIG. 22, in block 2238 the calibration device 110 may be isolated uniquely. As discussed above, while detecting the calibration device 110 in block 2230 may locate the calibration device, other objects in the image may have the same color as the calibration device 110 and may be mistakenly identified as well. As such, block 2238 utilizes the determined resolution indicator 254 to remove any extraneous objects that may be identified as the calibration device 110. In block 2240, a phase 1 color correction may be performed. In block 2242, a phase 2 color correction may be performed. In block 2244, a phase 3 color correction may be performed.

Figure 23:
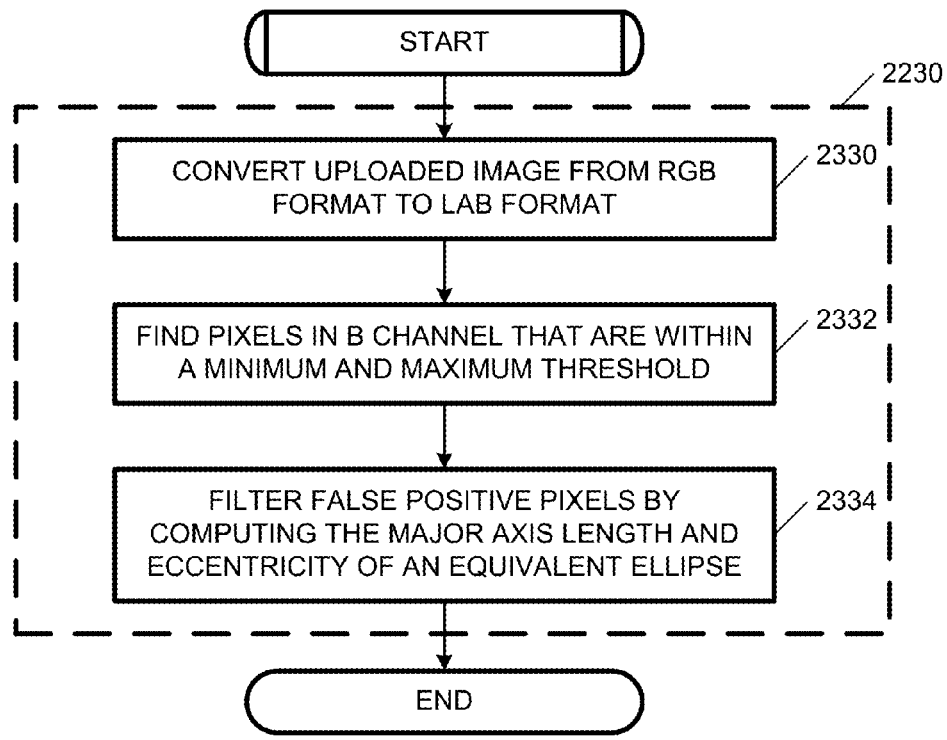
FIG. 23 depicts a flowchart for detecting a calibration device, according to some embodiments disclosed herein.

FIG. 23 depicts a flowchart for detecting a calibration device, according to some embodiments disclosed herein. As illustrated in the block 2230 of FIG. 22, calibration device 110 was detected. The blocks of FIG. 23 further elaborate on the device detection of FIG. 22. More specifically, in block 2330, the uploaded image may be converted from RGB format to LAB format. In block 2332, pixels in the B channel that are within a minimum and maximum threshold may be found. In block 2334, false positive pixels may be filtered by computing the major axis length and eccentricity of an equivalent ellipse.

Figure 24:
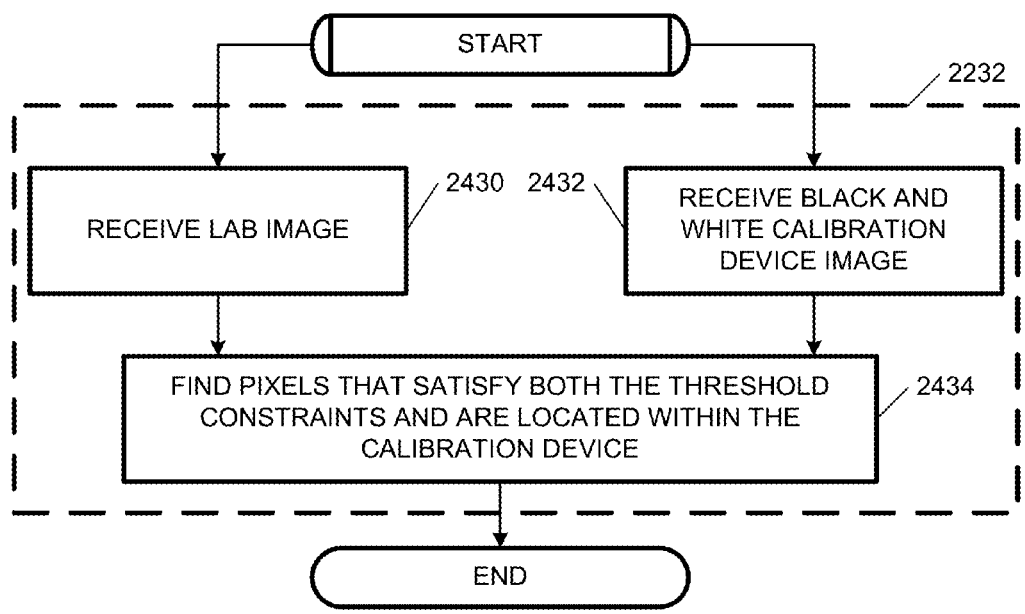
FIG. 24 depicts a flowchart for detecting a resolution indicator, according to some embodiments disclosed herein.

FIG. 24 depicts a flowchart for detecting a resolution indicator, according to some embodiments disclosed herein. More specifically, in block 2232 from FIG. 22, a plurality of actions may be performed. More specifically, in block 2430, the LAB image may be retrieved (e.g. from memory). In block 2432, the calibration device (RGB) image from block 2334 may be retrieved. In block 2434, each of these images may be analyzed to find pixels that satisfy the threshold constraints of both of the RGB image and the LAB image, as well as being located within a predetermined area for the calibration device 110. As discussed above, the LAB image determines thresholds for potential calibration devices. The calibration device image from 2334 may be used to filter out portions that are not in the appropriate area for the calibration device 110.

Figure 25:
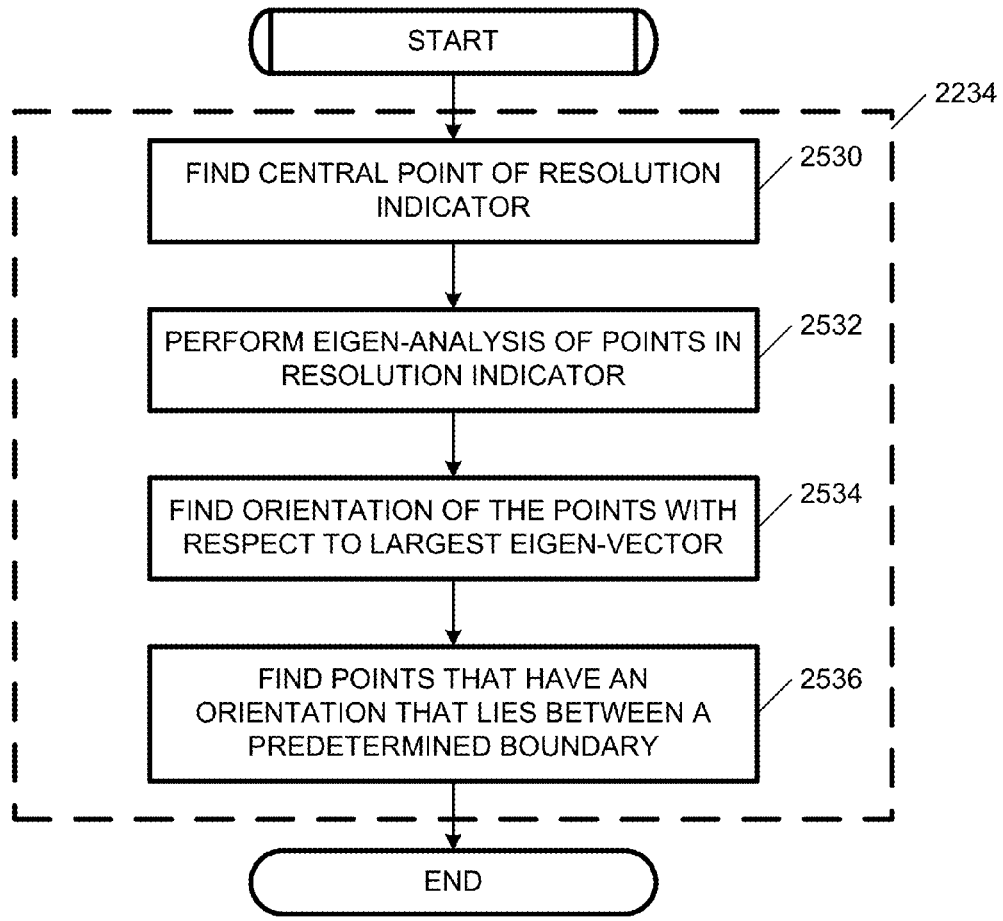
FIG. 25 depicts a flowchart for separating a resolution indicator, according to some embodiments disclosed herein.

FIG. 25 depicts a flowchart for separating a resolution indicator, according to some embodiments disclosed herein. More specifically, from FIG. 22, the block 2234 may be expanded into a plurality of actions. As illustrated in block 2530, a central point of the resolution indicator may be found. As discussed above, the central point may be found by determining the coordinates of the pixels in the resolution indicator 254. These coordinates may then be averaged, which yields the central point.

In block 2532, an Eigen-analysis of points in the resolution indicator space may be performed. More specifically, to determine which arm of the resolution indicator 254 is the horizontal arm, the Eigen-Vectors may be determined from the central point to each pixel in the resolution indicator 254. The Eigen-Vectors are then utilized to determine a direction of maximum radiation. From this determination, the horizontal arm (which in this example is longer) may be determined. In block 2534, an orientation of the points with respect to the largest Eigen-Vector may be found. In block 2536, points that have an orientation that lies between a predetermined boundary of the calibration device 110 may be found.

Figure 26:
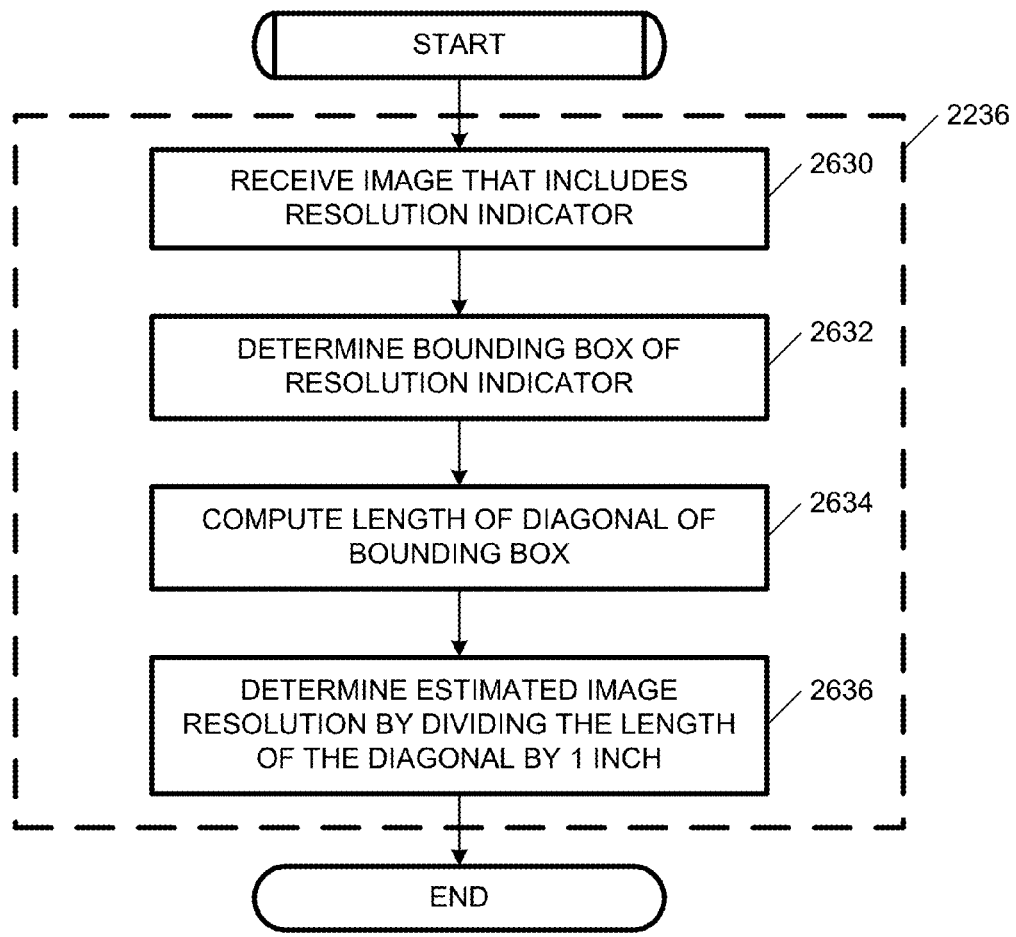
FIG. 26 depicts a flowchart for performing image resolution estimation, according to some embodiments disclosed herein.

FIG. 26 depicts a flowchart for performing image resolution estimation, according to some embodiments disclosed herein. More specifically, block 2236 from FIG. 22 may include a plurality of actions. As illustrated in block 2630, an image that includes the resolution indicator 254 may be received (e.g., the image from block 2536). In block 2632, a bounding box of the resolution indicator 254 may be determined. In block 2634, a length of the diagonal of the bounding box may be computed by counting pixels of the diagonal. In block 2636, an estimated image resolution may be determined by dividing the length of the diagonal by a predetermined length value, (e.g., 1 inch).

Figure 27:
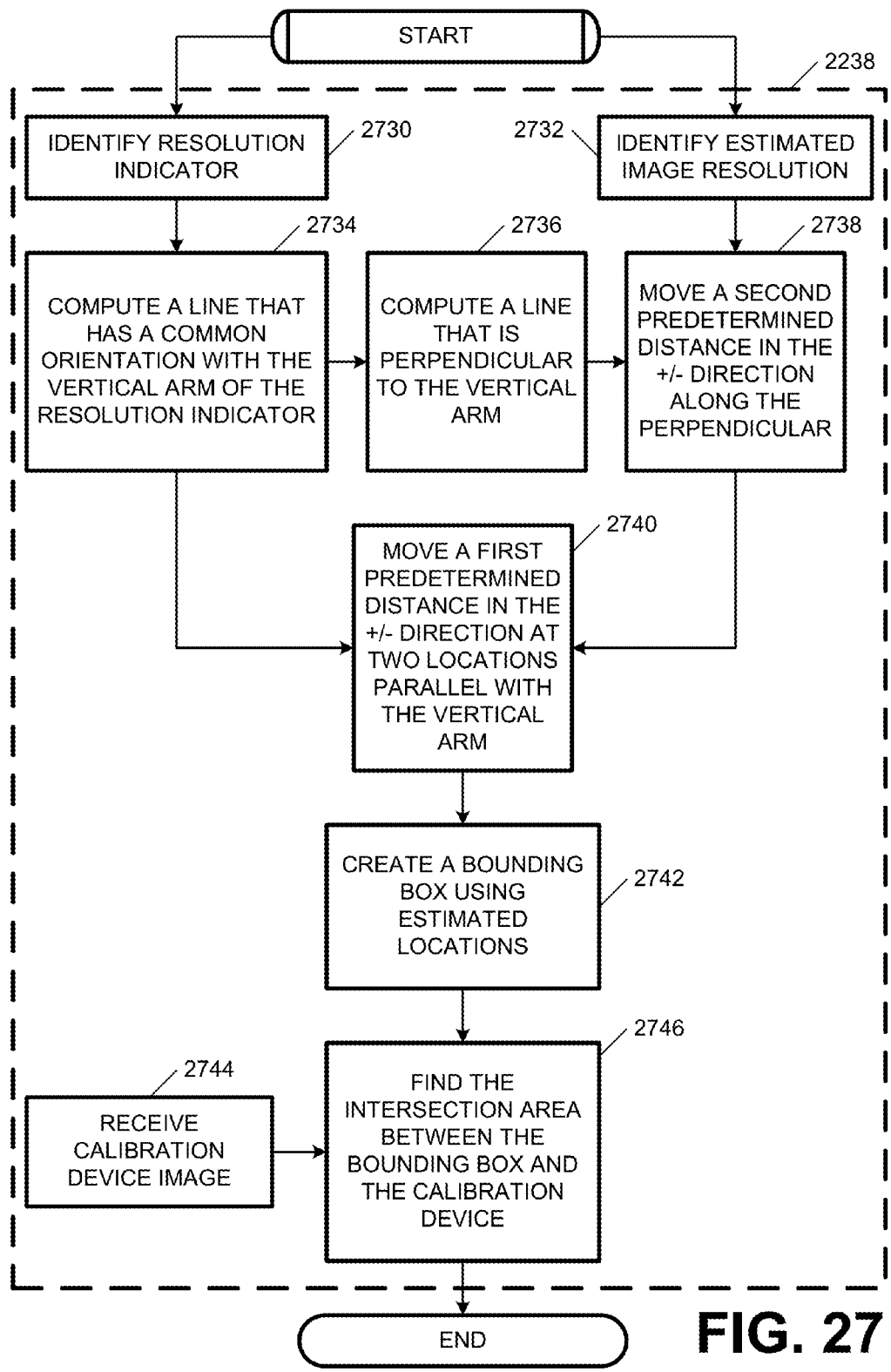
FIG. 27 depicts a flowchart for isolating the calibration device uniquely, according to some embodiments disclosed herein.

FIG. 27 depicts a flowchart for isolating the calibration device uniquely, according to some embodiments disclosed herein. More specifically, from block 2238 in FIG. 22, a plurality of actions may be performed. As illustrated in block 2730, the resolution indicator 254 may be identified. Similarly, in block 2732, the estimated image resolution may be identified (from FIG. 26). In block 2734, a first line that has a common orientation with the vertical arm of the resolution indicator may be computed. In block 2736, a second line that is perpendicular to the vertical arm may be computed. In block 2738, the first line may be moved a second predetermined distance in the +/− direction along the perpendicular line.

More specifically, if the calibration device 110 has a known length of 7 inches, the predetermined distance may be 3.5 inches in each direction. In block 2740, the second line may be moved a second predetermined distance in the +/− direction at two locations that are parallel with the vertical arm. So, if the calibration device 110 has a known width of 3 inches, the predetermined distance would be 1.5 inches in either direction. These predetermined distances should provide a bounding box that approximately outlines the calibration device 110. In block 2742, the bounding box may be created using estimated locations. In block 2744 the calibration device image may be received. In block 2746, an intersection area between the bounding box and the calibration device may be found.

Figure 28:
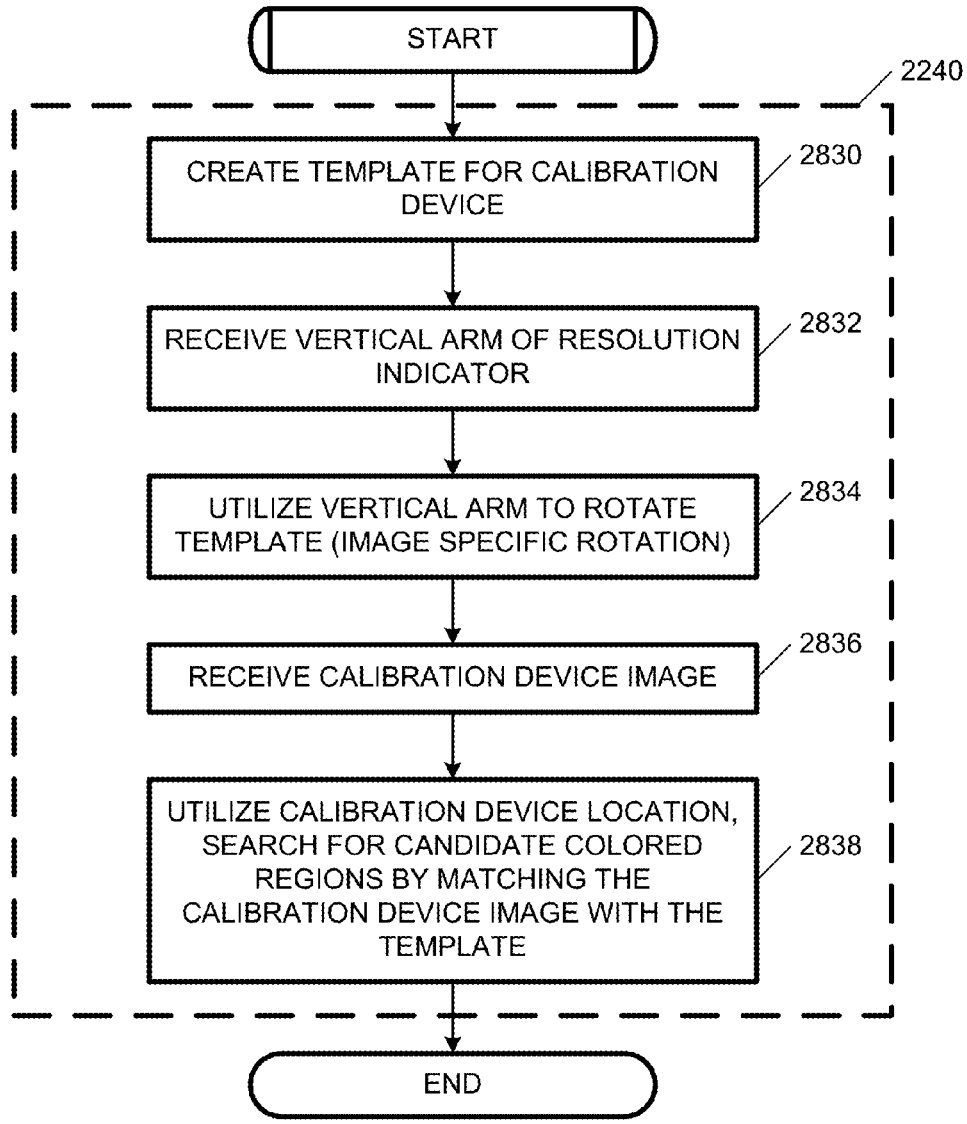
FIG. 28 depicts a flowchart for performing phase 1 image color correction, according to some embodiments disclosed herein.

FIG. 28 depicts a flowchart for performing phase 1 image color correction, according to some embodiments disclosed herein. More specifically, from block 2240 in FIG. 22, the phase 1 image color correction may include a plurality of actions. As illustrated in block 2830, a template for a calibration device 110 may be created. The template may identify the location and color of various portions of the calibration device 110. In block 2832, the vertical arm of the resolution indicator 254 may be received. In block 2834, the vertical arm may be utilized to rotate the template (which is image specific rotation). In block 2836, the calibration device image from block 2330 may be received. In block 283, the calibration device location may be utilized to search for candidate color chips by matching the calibration device image with the template.

Figure 29:
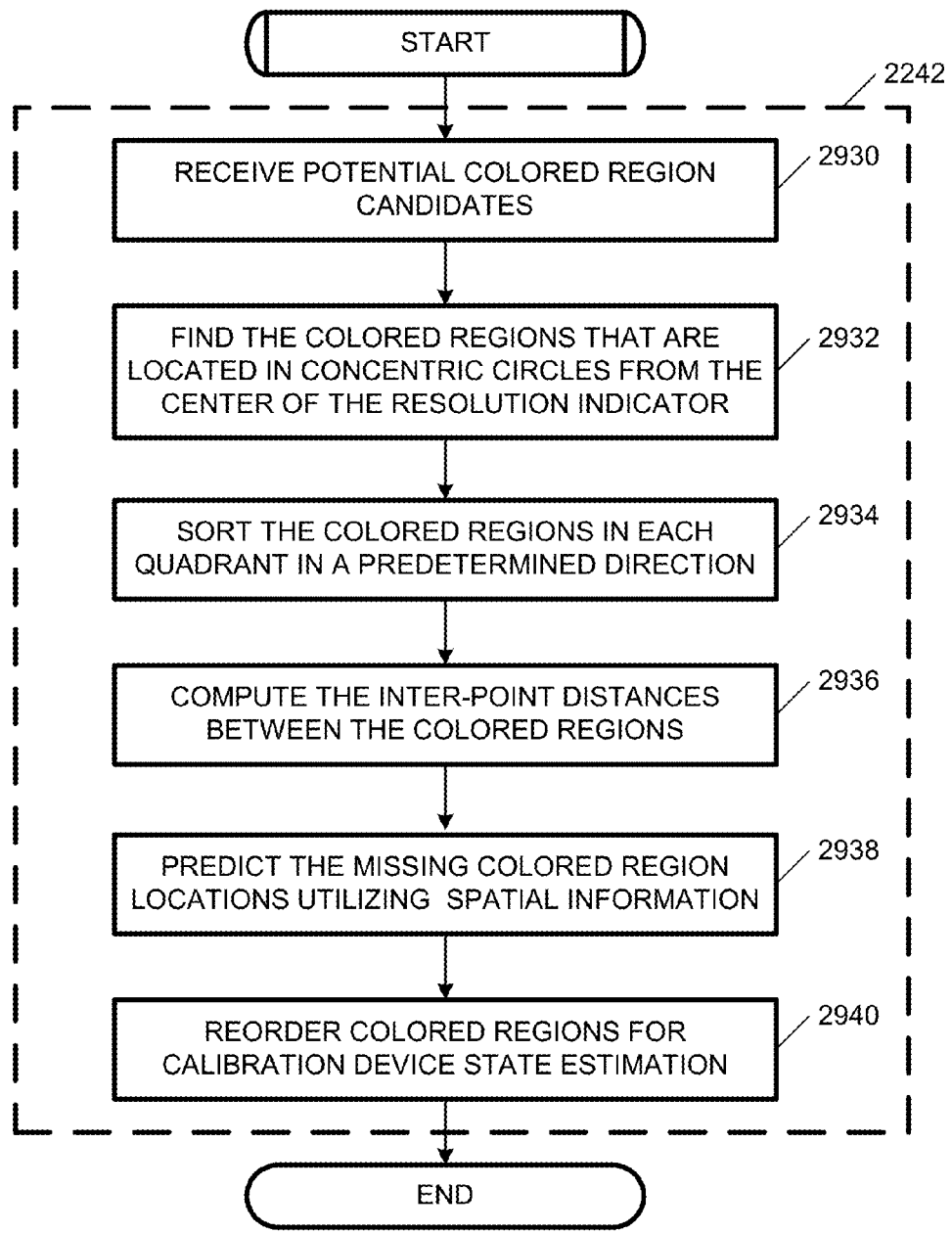
FIG. 29 depicts a flowchart for performing phase 2 image color correction, according to some embodiments disclosed herein.

FIG. 29 depicts a flowchart for performing phase 2 image color correction, according to some embodiments disclosed herein. More specifically, from block 2242 in FIG. 22, a plurality of actions may be performed in phase 2 color analysis. As illustrated in block 2930, potential colored region candidates may be received. In block 2932, the color chips that are located in concentric circles from the center of the resolution indicator 254 may be found. In block 2934, the color chips may be sorted in each quadrant in a predetermined direction. In block 2936, the inter-point distances between the color chips may be computed. More specifically, in the first concentric circle, the color chips closest to the resolution indicator 254 may be identified. In the second concentric circle, the color chips outside the closest color chips may be determined. Additionally, inter-point distances may be determined between each of the first tier color chips and each of the second tier color chips. In block 2938, the missing chip locations may be predicted utilizing known and determined special information. In block 2940, the color chips may be reordered for calibration device state estimation.

Figure 30:
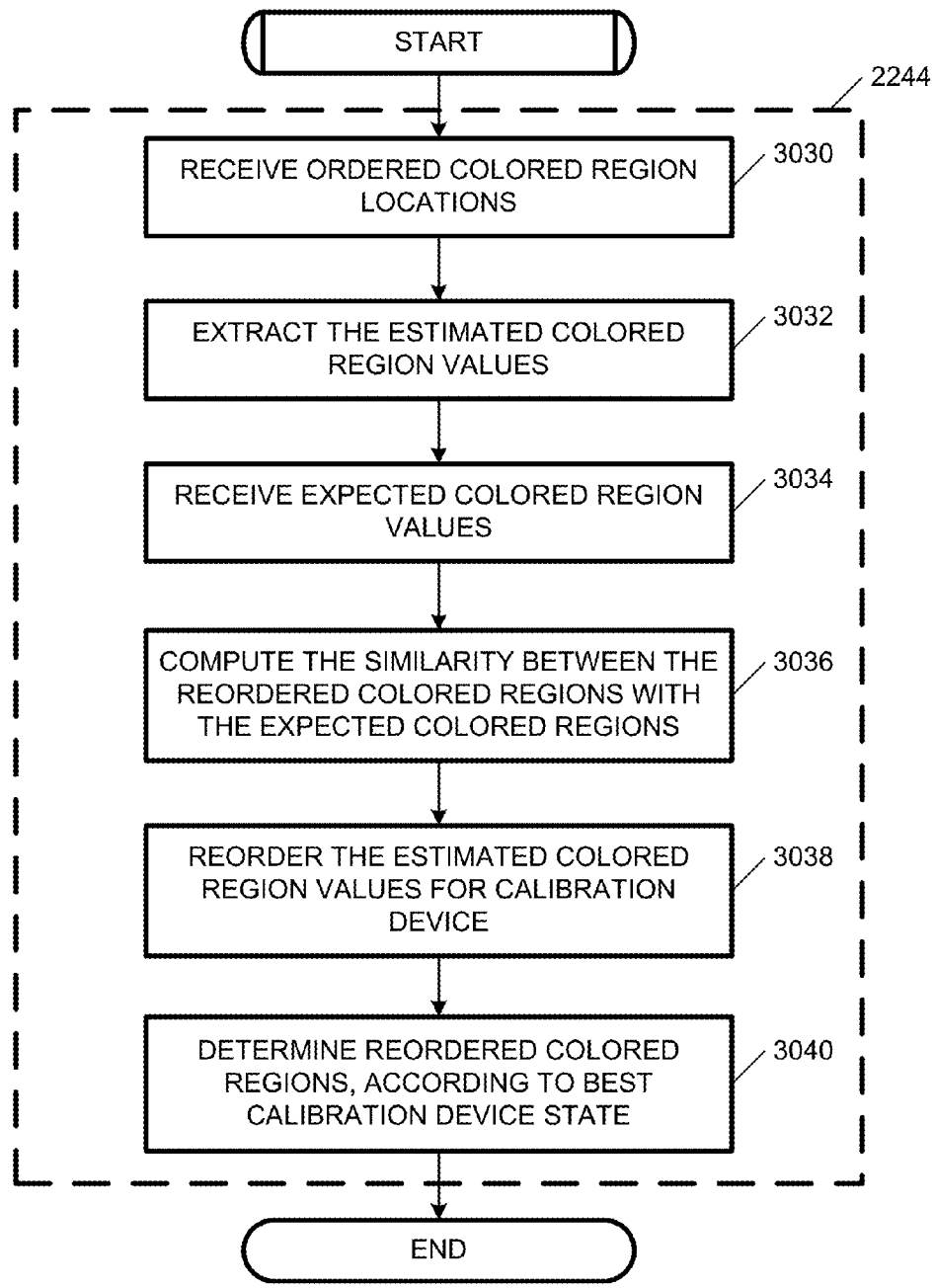
FIG. 30 depicts a flowchart for performing phase 3 image color correction, according to some embodiments disclosed herein.

FIG. 30 depicts a flowchart for performing phase 3 image color correction, according to some embodiments disclosed herein. More specifically, from block 2244 in FIG. 22, the phase 3 image color correction may include a plurality of different actions. As illustrated in block 3030, the ordered colored region locations may be received. In block 3032, the estimated color region values may be extracted from the image from block 2330. In block 3034, the expected color region values may be received. In block 3036, the similarity between the reordered color chips with the expected color chips may be computed. In block 3038, the estimated colored region values may be reordered for the calibration device 110. In block 3040, the reordered color chips may be determined, according to the best calibration device state.

Figure 31:
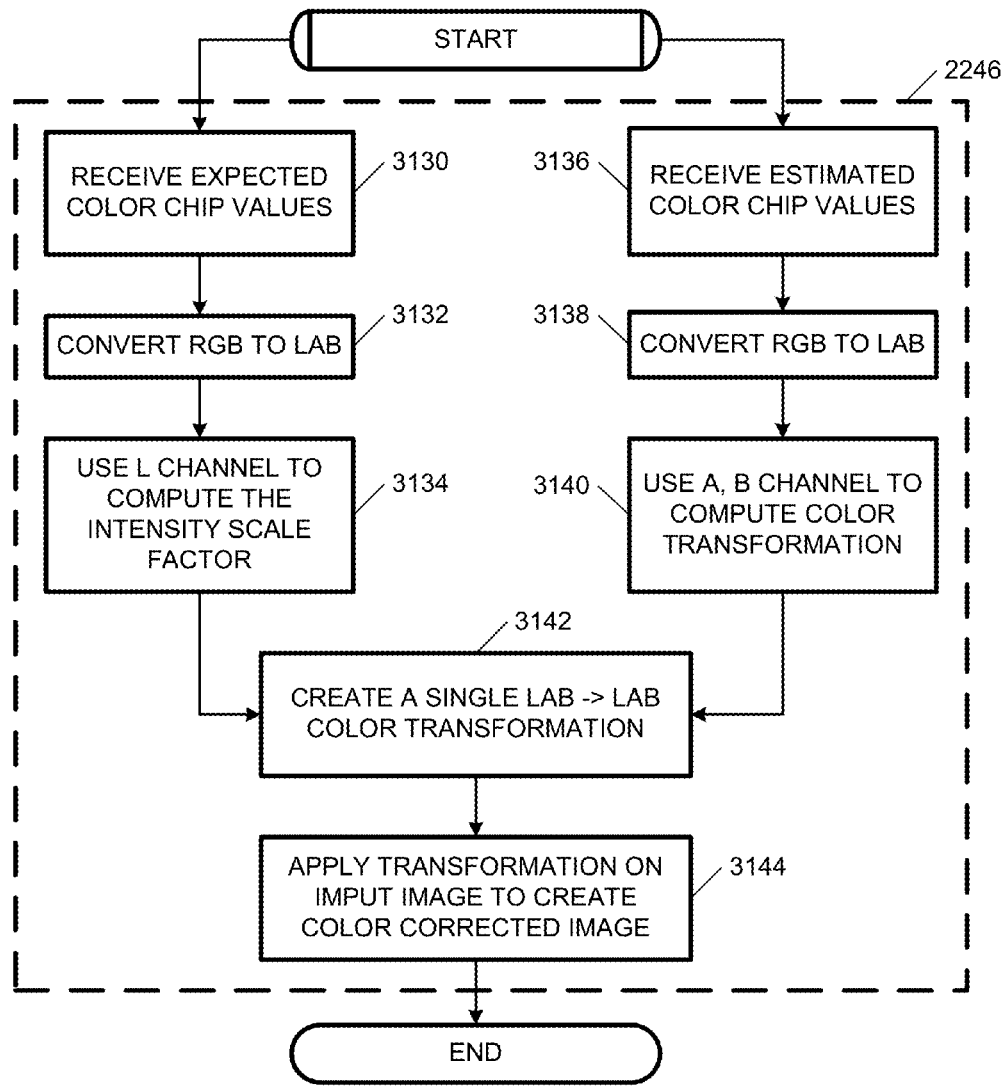
FIG. 31 depicts a flowchart for performing phase 4 image color correction, according to some embodiments disclosed herein.

FIG. 31 depicts a flowchart for performing phase 4 image color correction, according to some embodiments disclosed herein. More specifically, within block 2246 in FIG. 22, a plurality of actions may be performed. In block 3130, the expected color chip values may be received from FIG. 30. In block 3132, the expected color chip values may be converted from RGB format to LAB format. In block 3134, the L channel may be used to compute the intensity scale factor of the expected color chips.

Similarly, in block 3136, the estimated color chip values may be received. In block 3138, the estimated color chip values may be converted from RGB to LAB format. In block 3140, the A and B channels may be used to compute a color transformation of the estimated color chips. In block 3142, a single LAB to LAB color transformation may be performed to create a matrix of color transformation values. In block 3144, the transformation values may be applied on the uploaded image to create a color corrected image. Once this is complete, the process may end and/or continue in block 2134 from FIG. 21.

It should be understood that while the blocks 3130-3134 and 3136-3140 are depicted as being performed in parallel, this is merely an example. More specifically, these and other blocks described herein may be performed in a different order than depicted herein without departing from the intended scope of this disclosure.

In summary, persons of skill in the art will readily appreciate that systems, methods, and devices for providing products and consultations. The foregoing description has been presented for the purposes of illustration and description. It is not intended to be exhaustive or to limit the invention to the example embodiments disclosed. Many modifications and variations are possible in light of the above teachings. It is intended that the scope of the invention not be limited by this detailed description of example embodiments, but rather by the claims appended hereto.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A method for image analysis, comprising:
accessing a digital image of a subject, the digital image comprising a portion of a target substrate of the subject captured from a first angle;
performing a color correction on the digital image;
comparing the color-corrected digital image with a reference image, the reference image comprising at least a portion of a target substrate of a reference subject from an angle that is substantially similar to the first angle;
altering the color-corrected digital image to substantially match the reference image according to at least one image characteristic;
analyzing the altered color-corrected digital image to identify at least one condition in the portion of the target substrate; and
associating the at least one condition identified in the portion of the target substrate with one or more indicators.

2. The method of claim 1, comprising at least one of transmitting, displaying, and storing at least one of the digital image, the altered color-corrected digital image, data associated with altering the digital image, analysis data associated with the altered color-corrected digital image, the one or more indicators associated with the at least one condition in the portion of the target substrate, and data associated with the subject.

3. The method of claim 1, comprising:
receiving data related to the subject;
retrieving standard image characteristics that correspond with the data related to the subject; and
utilizing the standard image characteristics to alter the digital image.

4. The method of claim 3, wherein the data related to the subject comprises at least one of the following: an age of the subject, a location of the subject, an ethnicity of the subject, a gender of the subject, and a skin type of the subject.

5. The method of claim 1, wherein the condition comprises at least one of a mole, freckle, pore, red spot, spot, texture, wrinkle, hyper-pigmentation defect, and discoloration, and is located in at least one of the following areas: an area adjacent an eye and an area of a cheek of the subject.

6. The method of claim 1, wherein the reference subject is a mannequin.

7. The method of claim 1, wherein the at least one image characteristic comprises at least one of the following: image resolution, scaling, centering, position, size, tilt, relative pitch, and relative yaw.

8. The method of claim 1, wherein altering the color-corrected digital image comprises matching at least one feature on the portion of the target substrate of the subject with at least one corresponding feature on the portion of the target substrate of the reference subject and performing a spatial adjustment.

9. The method of claim 8, wherein the feature on the target substrate includes at least one of the following: a corner of an eye, a corner of a mouth, and a corner of a nostril.

10. The method of claim 1, comprising:
determining an image resolution;
determining whether the image resolution meets a predetermined first resolution threshold;
if the digital image does not meet the predetermined first resolution threshold, determining whether the digital image meets a predetermined second resolution threshold;
if the digital image meets the predetermined second resolution threshold, up-converting the digital image to meet the predetermined first resolution threshold; and
if the digital image does not meet the predetermined second resolution threshold, rejecting the digital image.

11. The method of claim 10, comprising:
determining whether the digital image exceeds the predetermined first resolution threshold; and
if the digital image exceeds the predetermined first resolution threshold, scaling-down the digital image to the predetermined first resolution threshold.

12. The method of claim 1, comprising detecting at least one feature on the portion of the target substrate, including:
creating a two-tone facial mask image; and
identifying pixels in the image that correspond to the portion of the target substrate.

13. The method of claim 1, comprising comparing the altered color-corrected digital image with a further altered color-corrected digital image that is based on a further digital image of the subject captured at a different time than the digital image of the subject.

14. The method of claim 1, comprising determining a severity associated with the at least one condition in the portion of the target substrate.

15. The method of claim 14, comprising comparing the severity associated with the at least one condition in the portion of the target substrate of the subject with a further severity associated with at least one condition in a portion of a target substrate of a further subject.

16. The method of claim 15, wherein the subject and the further subject are associated with a subject type determined in accordance with data related to the subjects comprising at least one of the following: age, location, ethnicity, gender, and skin type.

17. The method of claim 1, wherein the digital image contains a portion of a calibration device and performing a color correction on the digital image includes:
detecting a position of the calibration device by searching the digital image for a predetermined background color;
detecting a plurality of color chips on the calibration device, each color chip comprising a predetermined chip color;
comparing the chip color of at least one of the plurality of color chips with a predetermined color standard; and
correcting at least one color of the digital image in accordance with the comparison.

18. A system for image analysis, comprising:
one or more processors;
a memory component that stores logic that, when executed by the one or more processors, causes the system to perform at least the following:
access a digital image of a subject, the digital image comprising a portion of a target substrate of the subject captured from a first angle;
perform a color correction on the digital image;
compare the color-corrected digital image with a reference image, the reference image comprising at least a portion of a target substrate of a reference subject from an angle that is substantially similar to the first angle;
alter the color-corrected digital image to substantially match the reference image according to at least one image characteristic;

analyze the altered color-corrected digital image to identify at least one condition in the portion of the target substrate; and associate the at least one condition identified in the portion of the target substrate with one or more indicators.

19. The system of claim 18, wherein the logic, when executed by the one or more processors, causes the system to detect at least one feature on the portion of the target substrate, wherein detecting at least one feature on the portion of the target substrate comprises: creating a two-tone facial mask image; and identifying pixels in the image that correspond to the portion of the target substrate.

20. The system of claim 18, wherein the at least one image characteristic comprises at least one of the following: image resolution, scaling, centering, size, relative position, relative tilt, relative pitch, and relative yaw.

21. The system of claim 18, wherein the logic, when executed by one or more processors, causes the system to perform at least the following:
determine an image resolution;
determine whether the image resolution meets a predetermined first resolution threshold;
if the digital image does not meet the predetermined first resolution threshold, determine whether the digital image meets a predetermined second resolution threshold;
if the digital image meets the predetermined second resolution threshold, up-convert the digital image to meet the predetermined first resolution threshold; and
if the digital image does not meet the predetermined second resolution threshold, reject the digital image.

22. The system of claim 21, wherein the logic, when executed by the one or more processors, causes the system to perform at least the following:
determine whether the digital image exceeds the predetermined first resolution threshold; and
if the digital image exceeds the predetermined first resolution threshold, scale-down the digital image to the predetermined first resolution threshold.

23. The system of claim 18, wherein the logic, when executed by the one or more processors, causes the system to perform at least one of transmitting, displaying, and storing at least one of the digital image, the altered color-corrected digital image, data associated with altering the digital image, analysis data associated with the altered color-corrected digital image, the one or more indicators associated with the at least one condition in the portion of the target substrate, and data associated with the subject.

24. The system of claim 18, wherein the condition includes at least one of a mole, freckle, pore, red spot, spot, texture, wrinkle, hyper-pigmentation defect, and discoloration, and is located in at least one of the following areas: an area adjacent an eye and an area of a cheek of the subject.

25. The system of claim 18, wherein the reference subject is a mannequin.

26. The system of claim 18, wherein altering the color-corrected digital image comprises matching at least one feature on the portion of the target substrate of the subject with at least one corresponding feature on the portion of the target substrate of the reference subject and performing a spatial adjustment.

27. The system of claim 26, wherein the feature on the target substrate includes at least one of the following: a corner of an eye, a corner of a mouth, and a corner of a nostril.

28. The system of claim 18, wherein the logic, when executed by the one or more processors, causes the system to compare the altered color-corrected digital image with a further altered color-corrected digital image that is based on a further digital image of the subject captured at a different time than the digital image of the subject.

29. The system of claim 18, wherein the logic, when executed by the one or more processors, causes the system to determine a severity associated with the at least one condition in the portion of the target substrate.

30. The system of claim 29, wherein the logic, when executed by the one or more processors, causes the system to compare the severity associated with the at least one condition in the portion of the target substrate of the subject with a further severity associated with at least one condition in a portion of a target substrate of a further subject.

31. The system of claim 30, wherein the subject and the further subject are associated with a subject type determined in accordance with data related to the subjects comprising at least one of the following: age, location, ethnicity, gender, and skin type.

32. The system of claim 18, wherein the digital image contains a portion of a calibration device and performing a color correction on the digital image includes:
detecting a position of the calibration device by searching the digital image for a predetermined background color;
detecting a plurality of color chips on the calibration device, each color chip comprising a predetermined chip color;
comparing the chip color of at least one of the plurality of color chips with a predetermined color standard; and
correcting at least one color of the digital image in accordance with the comparison.

33. A method for image analysis, comprising:
accessing a digital image of a subject, the digital image comprising a portion of a target substrate of the subject captured from a first angle;
comparing the digital image with a reference image, the reference image comprising at least a portion of a target substrate of a reference subject from an angle that is substantially similar to the first angle;
altering the digital image to substantially match the reference image according to at least one image characteristic;
analyzing the altered digital image to identify at least one condition in the portion of the target substrate; and
associating the at least one condition identified in the portion of the target substrate with one or more indicators.

34. The method of claim 33, comprising at least one of transmitting, displaying, and storing at least one of the digital image, the altered digital image, data associated with altering the digital image, analysis data associated with the altered digital image, the one or more indicators associated with the at least one condition in the portion of the target substrate, and data associated with the subject.

35. The method of claim 33, wherein the condition comprises at least one of a mole, freckle, pore, red spot, spot, texture, wrinkle, hyper-pigmentation defect, and discoloration, and is located in at least one of the following areas: an area adjacent an eye and an area of a cheek of the subject.

36. The method of claim 33, wherein the at least one image characteristic comprises at least one of the following: image resolution, scaling, centering, position, size, tilt, relative pitch, and relative yaw.

37. The method of claim 33, wherein altering the digital image comprises matching at least one feature on the portion of the target substrate of the subject with at least one corresponding feature on the portion of the target substrate of the reference subject and performing a spatial adjustment.

38. The method of claim 33, comprising:
   determining an image resolution;
   comparing the image resolution to a predetermined first resolution threshold;
   if the digital image exceeds the predetermined first resolution threshold, scaling-down the digital image to the predetermined first resolution threshold;
   if the digital image does not meet the predetermined first resolution threshold, determining whether the digital image meets a predetermined second resolution threshold;
   if the digital image meets the predetermined second resolution threshold, up-converting the digital image to meet the predetermined first resolution threshold; and
   if the digital image does not meet the predetermined second resolution threshold, rejecting the digital image.

\* \* \* \* \*